United States Patent
Laffan et al.

(10) Patent No.: US 9,561,817 B2
(45) Date of Patent: Feb. 7, 2017

(54) STROLLER WITH TELESCOPIC AND LOCKING MEMBERS

(71) Applicant: City Bébé Ltd., Berwyn, PA (US)

(72) Inventors: Patrick William Laffan, Berwyn, PA (US); Leslie Stiba, Pflugerville, TX (US); Hao Tian, Minneapolis, MN (US)

(73) Assignee: Austlen Baby Co., Berwyn, PA (US)

( * ) Notice: Subject to any disclaimer, the term of this patent is extended or adjusted under 35 U.S.C. 154(b) by 0 days.

(21) Appl. No.: 14/194,712

(22) Filed: Mar. 1, 2014

(65) Prior Publication Data

US 2014/0346756 A1    Nov. 27, 2014

Related U.S. Application Data

(63) Continuation-in-part of application No. 14/069,169, filed on Oct. 31, 2013.

(Continued)

(51) Int. Cl.
| | |
|---|---|
| *B62B 7/12* | (2006.01) |
| *B62B 9/26* | (2006.01) |
| *B62B 7/06* | (2006.01) |
| *B62B 7/00* | (2006.01) |
| *B62B 7/10* | (2006.01) |

(52) U.S. Cl.
CPC ................ *B62B 9/26* (2013.01); *B62B 7/008* (2013.01); *B62B 7/06* (2013.01); *B62B 7/10* (2013.01); *B62B 7/12* (2013.01); *B62B 2206/02* (2013.01)

(58) Field of Classification Search
CPC .......... B62B 3/02; B62B 3/3022; B62B 7/004; B62B 7/06; B62B 7/062; B62B 7/08; B62B 7/10; B62B 9/28; B62B 2205/04; B62B 2206/02; A47B 88/00466; A47B 88/10; A47B 88/14; A47B 10/0032; A47B 10/0035; A47B 10/0037; A47B 10/004; A47B 10/0043; A47B 10/0045

See application file for complete search history.

(56) References Cited

U.S. PATENT DOCUMENTS 2,993,702 A * 7/1961 Gill ................................ 280/643
3,257,120 A * 6/1966 Browning .................. 280/47.17
(Continued)

FOREIGN PATENT DOCUMENTS

| WO | 2014/042524 | 3/2014 |
|---|---|---|
| WO | 2015/003227 | 1/2015 |

OTHER PUBLICATIONS

International Search Report and Written Opinion of the International Searching Authority dated Oct. 17, 2014 from corresponding PCT Application No. PCT/US14/41960.

(Continued)

*Primary Examiner* — Emma K Frick
(74) *Attorney, Agent, or Firm* — DLA Piper LLP (US)

(57) ABSTRACT

A stroller for carrying a child or child restraint system, that may comprise an additional storage area or child support system when expanded. The frames include a mechanism whereby the base of the frame is expanded rearward to create a storage space roughly behind the baby seat, and optionally where a top to the storage area folds up from the rear of the frame to complete the storage area. The stroller may include detachable wheels. The stroller may also include handles or push bars that may optionally include mechanisms to assist in expanding or contracting the storage area. The stroller may also be constructed so as to be collapsible for storage.

7 Claims, 30 Drawing Sheets

Related U.S. Application Data

(60) Provisional application No. 61/720,605, filed on Oct. 31, 2012.

(56) References Cited

U.S. PATENT DOCUMENTS

| | | | | |
|---|---|---|---|---|
| 4,643,446 | A | | 2/1987 | Murphy et al. |
| 4,705,491 | A | * | 11/1987 | Andersson .................... 464/167 |
| 4,832,354 | A | | 5/1989 | LaFreniere et al. |
| 4,898,566 | A | * | 2/1990 | Hakansson .................... 464/167 |
| 5,011,175 | A | | 4/1991 | Nicholson et al. |
| 5,312,122 | A | * | 5/1994 | Doty ........................ 280/33.992 |
| 5,562,300 | A | | 10/1996 | Nelson |
| 6,306,065 | B1 | * | 10/2001 | Liang ............................. 482/51 |
| 6,523,840 | B1 | * | 2/2003 | Koppes et al. ............ 280/47.35 |
| 6,565,112 | B2 | | 5/2003 | Hanson et al. |
| 7,523,954 | B2 | | 4/2009 | Dotsey et al. |
| 7,758,063 | B2 | | 7/2010 | Johnson et al. |
| 8,029,007 | B2 | * | 10/2011 | Jones et al. .............. 280/47.131 |
| 8,192,107 | B2 | * | 6/2012 | Solberg ........................ 403/377 |
| 8,931,805 | B2 | * | 1/2015 | Buzzard et al. ............... 280/775 |
| 2006/0082120 | A1 | * | 4/2006 | Taniguchi et al. ............ 280/777 |
| 2007/0069504 | A1 | | 3/2007 | Lan |
| 2009/0315300 | A1 | * | 12/2009 | Stiba ............................. 280/648 |
| 2013/0087993 | A1 | * | 4/2013 | Jacquet et al. ................. 280/647 |
| 2013/0193824 | A1 | * | 8/2013 | Koenig et al. ........... 312/334.11 |
| 2013/0230262 | A1 | * | 9/2013 | Park et al. ....................... 384/18 |
| 2014/0191645 | A1 | * | 7/2014 | Kuba et al. .............. 312/334.12 |
| 2014/0346756 | A1 | | 11/2014 | Laffan et al. |

OTHER PUBLICATIONS

Office Action dated Aug. 7, 2015 from corresponding U.S. Appl. No. 14/069,169.

Invitation to Pay Additional Fees dated Apr. 26, 2016, from corresponding PCT Application No. PCT/US16/16988.

* cited by examiner

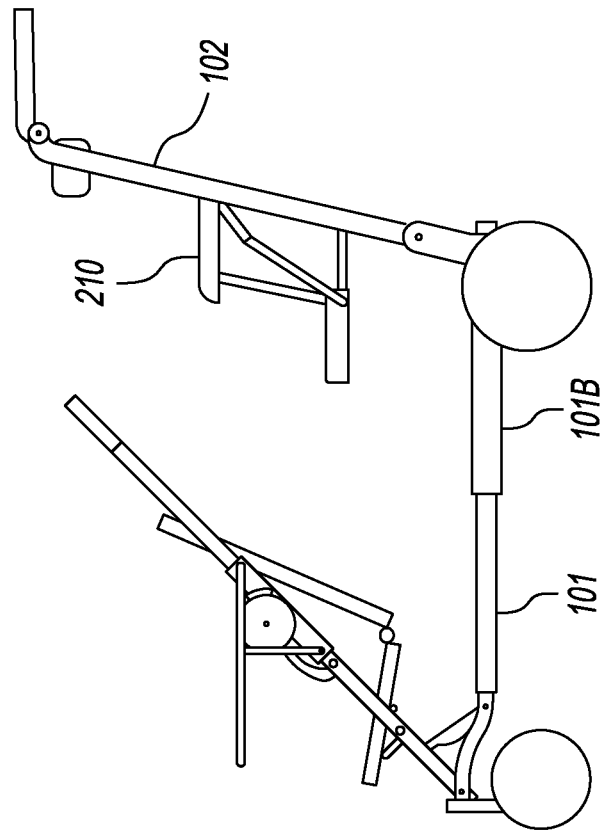
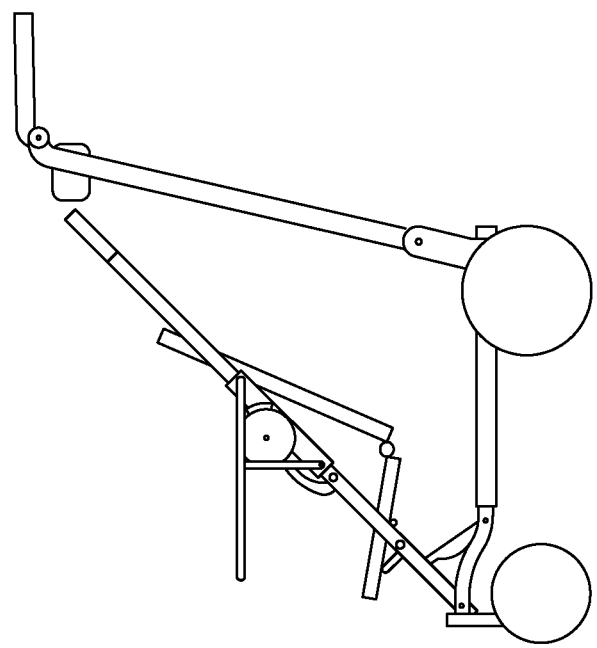
FIG. 13

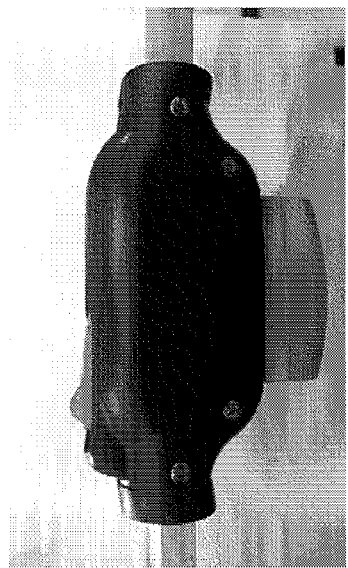
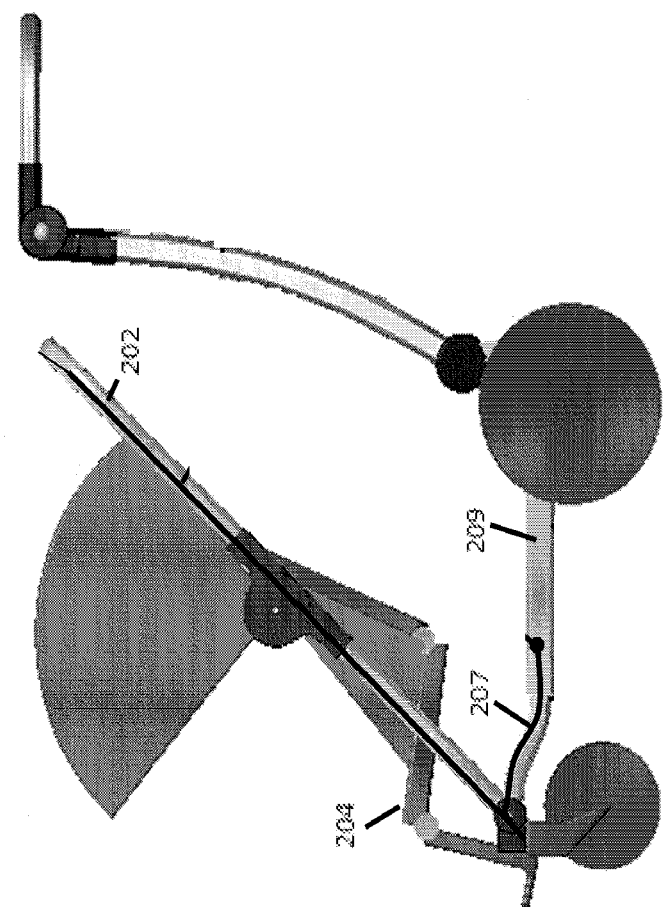
Fig. 22

STROLLER WITH TELESCOPIC AND LOCKING MEMBERS

CROSS-REFERENCE TO RELATED APPLICATIONS

The present application is a continuation-in-part of, claims the benefit of and priority from U.S. patent application Ser. No. 14/069,169, filed Oct. 31, 2013 and provisional patent application Ser. No. 61/720,605, entitled Stroller with Expandable Cargo Area, filed Oct. 31, 2012, the disclosures of which are incorporated herein by reference.

FIELD OF INVENTION

The present invention relates to baby strollers, and more particularly baby strollers which can be expanded or configured in such a way as to provide additional storage capabilities.

BRIEF DESCRIPTION OF THE INVENTION

The present invention relates to a baby stroller with enhanced capabilities for storage and/or multi-child configurations. The stroller in the present invention is capable of expanding from the rear, thereby creating a cargo space, and, thus, providing the ability to simultaneously transport a passenger such as a child, multiple children, as well as additional cargo, with or without passengers, using simple actuation mechanisms.

SUMMARY

Broadly, the present invention provides for a stroller for carrying a user, having a front frame member for supporting a seat. In one embodiment, there is a foldable rear member which folds down to create an additional base member. The foldable rear member can be actuated via a mechanism located at or near the rear frame, the nexus of the rear frame and base member, or the handle. In an alternative embodiment, there is a rear member which can expand by means of telescopically or slide-wise actuating a handle. In a third embodiment, there is an additional support member coupled between the front and rear frame member which expands to form an additional support when the base is expanded. In many embodiments, this cargo area is designed for flexibility, so that its size may be adjusted. Further, in some embodiments, the extendable cargo area includes additional seating capacity for one or more additional children.

BACKGROUND

Baby strollers have been known and used for a number of years to provide a comfortable device to move a baby or small child. The trend with baby strollers has been to reduce the size of the stroller, thus allowing it to be stored more easily. However, with the reduction of size has come the reduction of space that the strollers provide for carrying additional cargo, or multiple children. There remains the need for a baby stroller that can accommodate a large volume of goods and/or a secondary child, while still folding to a compact state.

U.S. Pat. No. 4,878,680 describes a convertible car seat and stroller combination apparatus comprising a padded child's seat having a telescopic U-shaped handle extending upward from behind the back of the seat, and a perimeter frame having four wheels extendible downward. The apparatus is distinguishable from the present invention at least in being limited to one occupant and requiring a perimeter frame for the wheels, as well as lacking an extendable cargo area.

U.S. Pat. No. 4,896,894 describes a stroller car seat apparatus comprising a conventional infant seat having a safety harness, a U-shaped padded front guard bar, a U-shaped telescoping handle in the rear, a pivoting front footrest, and a folding rectangular scissors framework with four wheels. The apparatus is distinguishable from the present invention at least in being limited to one child, requiring an obtrusive lower framework, and lacking an extendable cargo area. U.S. Pat. No. 5,360,221 describes a baby carriage convertible to a safety car seat with a harness comprising a body assembly including a seat, a back, a footrest, and side plates. A wheel assembly is pivotally mounted on the body assembly and adapted to be folded back. A handle assembly is pivotally mounted on the body assembly and adapted to be rotated into a horizontal position. A locking assembly locks and releases the wheel assembly. When the carriage is converted into a safety seat, the wheel assembly is released and folded back, and the handle assembly is rotated into a horizontal position to be used as an arm rest plate. The apparatus is distinguishable from the present invention at least in being limited to one child, requiring the rotation of the handle assembly to serve as an arm rest, and lacking an extendable cargo area.

U.S. Pat. No. 5,478,096 Chien Ting describes a collapsible multi-use baby carriage having a structure transformable into a dining chair, a safety seat in a car, a cradle, and a bed comprising a seat, a backrest pivotally connected with the seat to change the angle of the backrest, a U-shaped hand rest pivotally connected with the backrest. The structure has a pushing handle, two opposite telescopic side tubes with a windable support plate between the side tubes, and a winding tubular shaft housed in a front tube of the hand rest for pulling out for supporting food. Two front and rear casters are pivotally connected with the bottom of the seat and foldable to the seat bottom. The carriage is distinguishable from the present invention at least in being limited to one child, requiring a windable support plate and two opposite side tubes, and lacking an extendable cargo area.

U.S. Pat. Nos. 6,523,840, 6,669,212 B2 and 6,523,840 B1 (related patents) describe a combined shopping cart stroller, with a frame that includes a primarily horizontal lower frame portion having a forward end and a rearward end; a curved upper frame portion; vertical support extending between the lower frame portion and upper frame portion; a seat mounted to the frame; and a primary cargo area, which is defined as the space generally bounded by the lower frame portion and the upper frame portion rearward of the seating area. The shopping cart stroller is distinguished from the present invention at least in the front frame not extending to a point above the rearward frame when the cargo space is engaged, the manner in which the primary cargo space extends, as well as the fact that the primary cargo space is unable to support the weight of an additional child.

U.S. Pat. No. 7,188,858 B2 describes a collapsible stroller, with a frame having left and right sides, each side comprising: an elongated bottom member; a front leg; a push arm; and a support strut, wherein the front leg, the push arm, and the support strut pivot relative to each other when the stroller moves between the open position and the folded position. The stroller is distinguishable from the current invention at least in being limited to one child, and not having an extendable rear cargo space.

U.K. Patent Application No. GB 2 262 914 A published on Jul. 7, 1993, describes a molded child seat for a vehicle and convertible into a pushchair comprising a supporting frame having two triangular lateral sub-frames interconnected by cross rails. Each sub-frame is equipped with a pair of mounting pins adapted to engage with appropriately shaped and positioned slots on the wheeled pushchair frame. The apparatus is distinguishable from the present invention at least in being limited to one child, requiring a separate supporting frame, and lacking an extendable cargo area.

U.S. Pat. No. 5,544,904 discloses a convertible stroller and shopping cart having a stroller portion and a shopping cart portion. The stroller portion includes a seat secured to a metal frame, and the shopping cart portion comprises a collapsible receptacle. The receptacle can be oriented in two orientations, a stowed orientation adjacent the seat and a deployed orientation over the seat. When the receptacle is deployed, it conforms to the seat, creating a shopping cart from the stroller. The convertible stroller is distinguishable from the present invention at least in lacking the capacity to carry a second child, and in the fact that the extendable cargo area extends to occupy the same volume as the child seat when extended.

U.S. Pat. No. 6,669,212 discloses a cart having a frame member including upright and lateral frame portions. A platform is attached to the lateral frame portion and a stationary seat assembly is secured to the upright frame portion. The stationary seat assembly includes a rearward facing stationary seat, a handle and a safety bar between the seat and the handle. A pivoting mechanism is mounted to the lateral frame portion remote from the upright frame portion. The pivoting mechanism is moveable between a substantially upright position and a retracted position and is located relative to a back portion of the seat. A flexible receptacle is attached to the pivoting mechanism, and moves between an open and collapsed position when the pivoting mechanism is moved between the substantially upright and the retracted position, respectively. The stationary seat and the platform are accessible when the pivoting mechanism is in the substantially upright position or the retracted position. The cart is distinguishable from the present invention at least in that the present invention is fully collapsible, can accommodate a second child, and in having an extendable cargo area which includes an extendable base component.

U.S. Pat. Nos. 6,378,891 and 6,170,854 disclose a convertible stroller and shopping vehicle having a stroller portion and a shopping vehicle portion. The stroller portion includes a seat which is movable from a deployed position to a stowed position. In the deployed position, the invention is used as a stroller. The shopping vehicle portion includes a collapsible receptacle that can be oriented in one of two orientations. In an open orientation, the receptacle creates a shopping cart while in a collapsed orientation the invention can be used to transport bulk materials. The convertible stroller is distinguishable from the present invention at least by lacking the capacity to carry a second child, and in the fact that the extendable cargo area extends to occupy the same volume as the child seat when extended.

U.S. Pat. No. 8,070,180 (which has the same inventor as the present invention) discloses a stroller for carrying a user, and having an expandable storage space located between the child seat and the rearmost frame members. This may include a first and second front frame member for supporting a seat or seats and back support member, a first and second back frame member being connected to the first and second front frame member, an expandable base member, which connects between the first and second front frame member and the first and second back frame member. The expandable frame member may move between an extended and a retracted position to provide a storage area. This invention discloses a stroller with an expandable storage space, however, the volume of the storage space is not adjustable, he invention does not provide mechanisms for actuating the deployment of the extendable cargo area, the invention does not provide a rear handle lock to take the load of additional cargo, the invention does not provide a solution for folding the front seat compactly and independently of the rear frame, the invention does not provide methods for compactly folding the upper expandable basket, and the invention does not provide for additional seating configurations within the expandable storage space.

U.S. Pat. No. 6,676,140 B1 discloses a two-seat collapsible stroller comprising a telescopically collapsing rear section that roughly slides into the front section such that the seat nests onto the front seat in the collapsed position. This stroller differs from the present invention at least in that the second seat is a mandatory part of the invention, and no extendable cargo area exists.

U.S. Pat. No. 8,366,141 discloses a stroller with a collapsible seat for a second child, comprising a complex coupling mechanism that enables the collapse and expansion mechanism. It is distinguishable from the present invention at least in that the stroller's collapse mechanism for the second seat is substantially more complex than in the present invention, and in that it does not provide for the option of an extendable cargo area.

In general, the prior art contains a series of weaknesses which the present invention addresses. First, most prior art lacks the capacity to form an extendable cargo area while simultaneously carrying even a single child: the cargo area extends into the area where the child would sit. Second, those few inventions designed to include a second child both lack the flexibility to also include extendable storage, and include complex or inflexible deployment mechanisms which prevent the strollers from being deployed easily and/or folded into compact form. The present invention, as will be shown, is capable of simultaneously carrying a child and having the cargo area extended/deployed in a way that can handle heavy loads, is easily expanded via actuation mechanisms, is of such a nature that it can also function as additional seating space for additional children. Finally, the present invention is designed to be easily folded into a compact state for travel or storage.

BRIEF DESCRIPTION OF THE DRAWINGS

The invention may be understood by reference to the following description taken in conjunction with the accompanying drawings, in which, like reference numerals identify like elements, and in which:

FIG. 13 illustrates an alternative embodiment of the stroller having a rear child seat.

FIG. 22 is a diagrammatic illustration side view and detail of a stroller telescoping member locking mechanism of the present disclosure.

DETAILED DESCRIPTION

The following description of the preferred embodiment or embodiments is not intended to limit the scope of the invention to the precise form or forms disclosed, but instead is intended to be illustrative of the principles of the invention so that others skilled in the art may follow its teachings.

Figure 1:
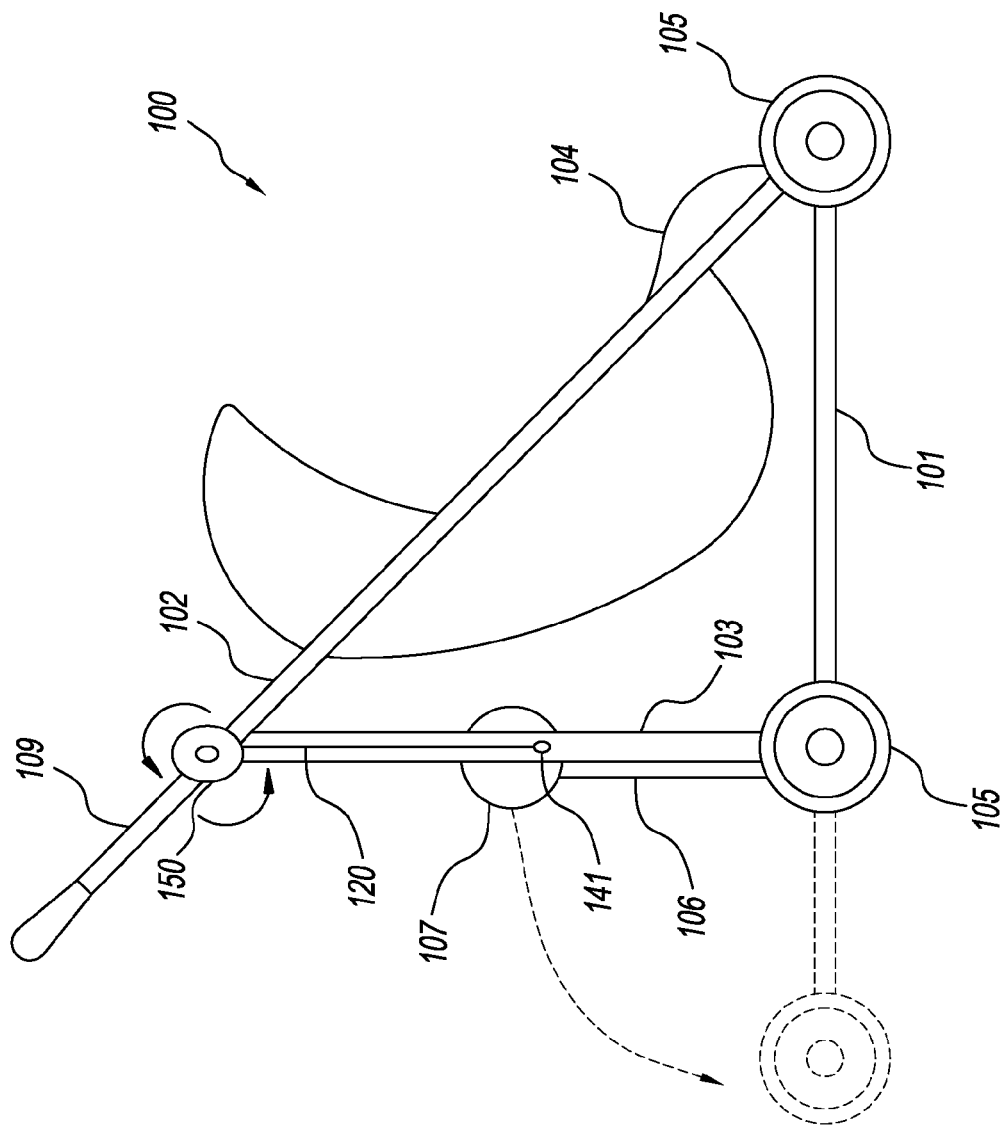
FIG. 1 illustrates a side elevational view of the preferred embodiment of the stroller in a retracted position.

FIG. 1 illustrates a stroller 100 in accordance with the teachings of the present invention without the rear member engaged, shown at a side elevational view. FIG. 1 illustrates a base main frame member 101 roughly parallel to the ground, a diagonal main frame member 102, and a rear main frame member 103 roughly perpendicular to the ground. The main frame section of the present invention, comprised of members 101, 102, and 103 is comprised of two mirror sides, connected by cross members. The bottom end, or a section substantially near the bottom end of frame member 103 is connected to frame member 101 at or substantially near the rear end of frame member 101. In the present embodiment, frame members 101 and 103 are connected at or substantially at a right angle, so that frame member 101 is parallel or substantially parallel to the ground, and frame member 103 is vertical or substantially vertical. In some embodiments, the angle at which frame members 101 and 103 are connected may be substantially acute or obtuse. In some embodiments, frame member 103 may attach near the middle or front of member 101. In some alternative embodiments, frame member 103 may be located generally midway along member 101. In some alternative embodiments, frame member 103 may be located near the nexus of member 101 and 104. In some alternative embodiments, frame member 103 may not be present.

FIG. 1 further illustrates frame member 102, which connects to frame members 101 and 103 to complete the main frame section. FIG. 1 illustrates that the top, or a section substantially near the top, of frame member 102 is connected at or substantially near the top of frame member 103, and the bottom, or a section substantially near the bottom, of frame member 102 is connected at or substantially near the front of frame member 101. In some alternative embodiments, frame member 103 may be joined to frame member 102 at alternative locations, such as nearer to the middle or front of frame member 102. One skilled in the art will recognize that the location of the connections between members 102 and 103, and 101 and 103 will largely determine the angle of 103.

In the present invention, members 101, 102, and 103 are made out of a single piece of material. In alternative embodiments, member 101, 102, and 103 may be composed of two or more separate components, so as to change the angle of the handle of the stroller, and to enable folding (see FIGS. 5a-d, 6, 12, and 13). The means with which frame members 101, 102, and 103 are connected can be by screws, brackets, welds, rivets or any other suitably strong means. Additionally, frame members 101, 102, and 103 may be made of metal, plastic, or any other suitably strong material. In alternative embodiments, there may be handles connected at or near the junctions of frame members 102 and 103, or at the top-rearmost end of member 102. Furthermore, the handle may serve as a cross-member, linking the mirrored frames of the invention.

FIG. 1 illustrates that the wheel members 105 are attached at or around the junctions of frame members 101 and 102, and 101 and 103. In the present embodiment, wheel members 105 can rotate freely 360 degrees along the axis (as, e.g., swivel wheels). In alternative embodiments, the wheels can have other degrees of rotational freedom. FIG. 1 illustrates seat member 104, which is attached to frame member 102. Seat member 104 may be made from a flexible material, for example fabric or durable plastic cloth. Alternatively, seat member 104 may be made from a harder material, for example solid plastic, metal, or any other suitable material, and may or may not be covered with a padding material for child comfort. The present invention shows seat member 104 containing a canopy, in order to protect a child from sun, rain, or any other weather. In a preferred embodiment, this canopy is retractable, allowing the child to enjoy pleasant weather. In alternative embodiments, this canopy may be fixed in a way so that it cannot be retracted, or it may be absent altogether. In alternative embodiments, seat member 104 may be replaced by at least one seat attachment device, in which alternate seat configurations such as modular seats, car seats, carry cots or alternate child restraint systems may be mounted to the seat attachment device and or frame support members.

FIG. 1 additionally illustrates a foldable base member 106, which folds and/or pivots out to form a rear base member. FIG. 1 shows this rear member in a retracted position, so that the rear member is not engaged. FIG. 1 illustrates member 106 attached to the main frame section at or substantially near the nexus of main frame members 101 and 103. In alternative embodiments, member 106 may be attached to member 101, or the wheel/wheel assembly of member 105. In the current embodiment, member 106 is deployed via actuator 150, which engages cable 120 to release pin 141. In alternate embodiments, the location of actuators and locking devices or cables may be at any point along the frame or wheel members. In alternate embodiments, actuators may be levers, buttons, or any other suitable device for deploying member 106. When folded up, member 106 may sit substantially vertical, and flush up against frame member 103, and when folded down, member 106 may sit substantially parallel to the ground, aligned to be roughly parallel with frame member 101. In alternative embodiments, stowed, member 106 may sit parallel to member 101, or at any suitable position between members 101 and 103. Member 106 can be constructed of metal, plastic or any other suitably strong material so as to support the weight of a child and/or any additional items carried in the cargo area when the stroller is configured as such. The present invention shows member 106 as being a single piece of material. In alternative embodiments, member 106 may be comprised of multiple parts, so as to be telescopic (retracting and extending), slideable, or otherwise shortenable so as to be less noticeable when folded up. Additionally, member 106 may be made so as to be completely detachable. In some embodiments, member 106 may be attached via a quick-release mechanism.

FIG. 1 illustrates a wheel member 107, which is attached at or substantially near the top of member 106 (when member 106 is folded vertically), so that when folded down, the base of the rear cargo section is more stable because of the support provided by wheel 107. In alternate embodiments, wheel member 107 may not be attached to member 106, if member 106 is of a length that does not require additional support. The wheel member 107 can comprise one or a plurality of wheels. In the present embodiment, wheel member 107 can only rotate at a limited angle along the axis (e.g., a limited-movement swivel). In alternative embodiments, the wheel or wheels can have other degrees of rotational freedom.

FIG. 1 illustrates handle member 109, which is pivotably affixed to frame member 102. In alternative embodiments, member 109 may be attached to, or be an integral part of a telescopic expansion of mirrored frame members 102 (as in FIG. 5). In some embodiments, handle 109 may be attached to mirrored frame members 103, or may be attached to, or be an integral part of a telescopic expansion of mirrored frame members 103. The range of motion at which member 109 can pivot is not limited to particular angles with respect to member (103) 102. Additionally, in alternative embodiments, member 109 may be connected to a different member of the main frame section, as long as its primary functionality of providing a comfortable pushing and steering mechanism for the device is maintained. Member 109 can be made out of metal, plastic, or any other similarly suitable material. In alternative embodiments, the handle 109 can be shaped differently; with its design not being limited to any particular curved or straight shapes, and in alternative embodiments may be designed as two separate left and right handles (hence not linking mirrored frame members). This handle 109 can be made out of plastic, metal, or some other suitable material, and may additionally be wrapped in foam, rubber, fabric, or some other padding material.

Figure 2:
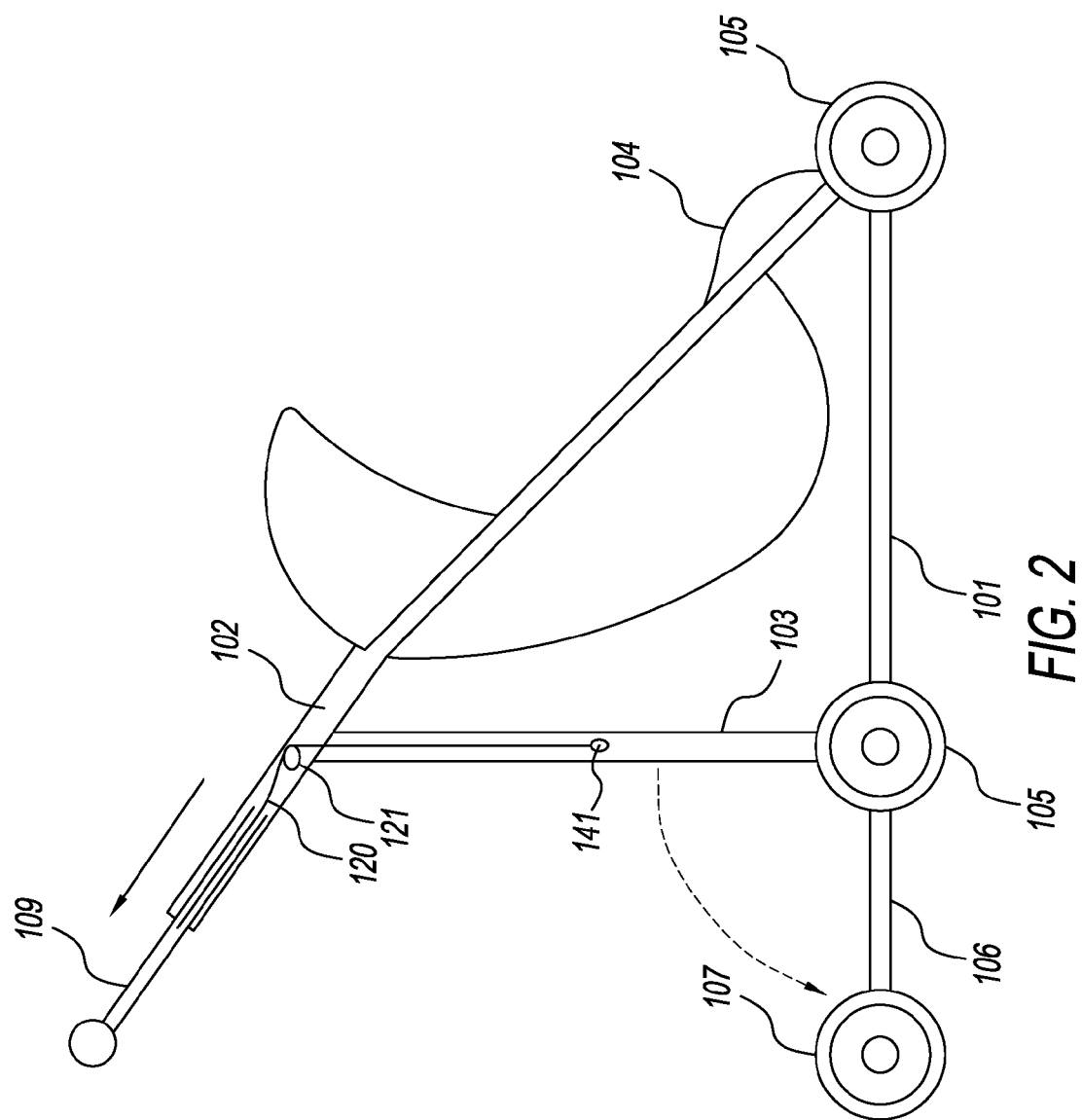
FIG. 2 illustrates a side elevational view of the preferred embodiment of the stroller with the rear member expanded.

FIG. 2 illustrates a stroller 100 in accordance with the teachings of the present invention with the rear member in the deployed state. The embodiment shown is similar to that shown in FIG. 1, but with the rear member folded down along its joint with the structural frame so as to be roughly parallel to the ground and member 101. FIG. 2 additionally shows the position of wheel member 107 when member 106 is folded down—the wheel is now in contact with the ground so as to provide support for member 106. Additionally, FIG. 2 illustrates how handle 109 can be constructed to telescopically expand as a means to lengthen the handle. In the illustrated embodiment, the telescopic expansion of handle 109 actuates the deployment of rear member 106 by pulling cable 120 which engages pulley 121 to release pin 141. In other embodiments, the placement of pin 141 can be located at any location in which release of member 106 or wheel member 107 can occur. In other embodiments, pin 141 may be a lock, clamp, or other retaining mechanism to allow member 106 to move from a stowed to a deployed state (See FIGS. 5A-d for more detail). In alternative embodiments, a lever or button actuation mechanism can release the pin, lock, clamp, or other retaining mechanism holding member 106, thus allowing it to deploy. In other embodiments, the cable and/or pulley mechanisms may run through or along other frame members, or any combination of frame members which result in deployment of member 106. The lever or button to release member 106 can be located at many locations along stroller 100, and may be actuated by hand, by foot, or a combination of the two.

Figure 3A:
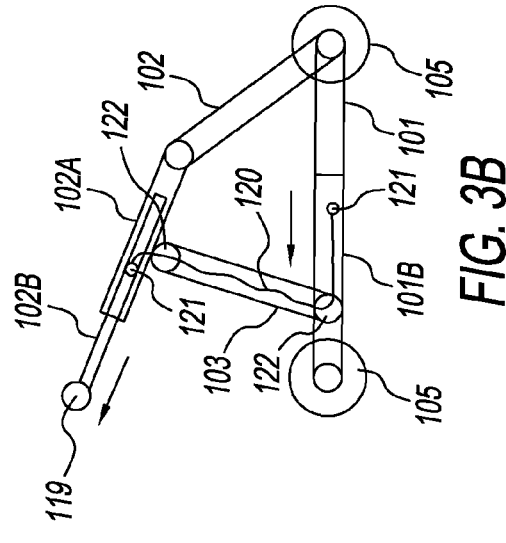
FIG. 3a. illustrates a side elevational view of an alternative embodiment of the stroller, in which the rear member is not expanded, and in which a cable, being connected to an extendable handle and extendable base member, runs through the frame, so that a user can engage the rear extendable member by actuating the handle.

FIG. 3a illustrates a stroller 100 in accordance with the teachings of the present invention, shown at a side elevational view with the rear base member not engaged, and with alternative embodiments in some of the members. FIG. 3a. illustrates base main frame member 101, expandable base main frame member 101b, front frame members 102 and 102a, and rear main frame member 103. The main frame section of the present invention is comprised of mirrored structural frames connected by cross members, each mirrored structural frame comprising members 101, 101b, 102, 102a, and 103.

FIG. 3a. illustrates the base of the stroller 100 as being comprised of frame members 101 and 101b, and as being substantially parallel with the ground. FIG. 5a. illustrates frame member 101 as forming the frontward section of the extendable base frame member, and 101b as forming the rearward section of the extendable base frame member. Members 101 and 101b are designed to form an expanding base. This is accomplished by having parts 101 and 101b move parallel relative to one another. In some embodiments, this may be done by having the two components slide (as, e.g., on rails) parallel to each other. In other embodiments, one component may telescope within another. In other embodiments still, one component or another may be made of sub-components which allow the part itself to telescope within itself. Specifically, FIG. 5a. illustrates frame member 101 fitting inside extendable frame member 101b. In an alternative embodiment, member 101b can fit inside member 101; in yet another alternative embodiment, member 101b itself may be composed of multiple, telescoping components. In yet another embodiment, member 101 may have rails on which 101b moves. In still other embodiments, 101b may have rails along which 101 moves. In a further embodiment, members 101 and 101B slide along each other for extension and retraction. The means with which members 101 and 101b are connected can be by screws, brackets, welds, pins, rails, slots, slides, or any other suitably strong means. Members 101 and 101b can be made out of metal, plastic, or any other similarly suitably strong material. The bottom end, or a section substantially near the bottom end, of frame member 103 is connected to the extendable frame member 101.

In the present embodiment, frame members 101 and 103 are connected at a substantially acute angle in relation to the front of the frame, so that frame member 103 is leaning substantially towards the front of the stroller (see FIG. 5a.). In alternative embodiments, the angle at which frame members 101 and 103 are connected may be substantially more acute, obtuse, or may form a substantially right angle, with relation to the front of the stroller. The means with which frame members 101 and 103 are connected can be by screws, brackets, welds, pins, or any other suitably strong means. In alternative embodiments, the lower end of member 103 may be attached to extendable member 101b. In preferred versions of this embodiment, member 103 is slidably attached to extendable member 101b, so that the movement of member 101b does not substantially alter the angle at which 103 is attached. Member 103 can be made out of metal, plastic, or any other similarly strong material.

FIG. 3a. illustrates frame member 102, with the bottom end, or a section substantially near the bottom end, of member 102 connecting to the front, or a section substantially near the front, of base frame member 101. In the present embodiment, members 101 and 102 are connected at a substantially acute angle in relation to the front of the frame, so that frame member 102 is leaning substantially towards the rear of the stroller (see FIG. 5a). In alternative embodiments, the angle at which frame members 101 and 102 are connected may be substantially more obtuse, acute, or may form a substantially right angle, with relation to the front of the frame of the stroller, so long as it still forms a sturdy frame to support the potential load on the stroller. Additionally, member 102 can be made out of metal, plastic, or any other similarly strong material.

FIG. 3a. illustrates frame member 102a, with the front of member 102a connecting to the top of frame member 102, with the top of member 103 connected to 102a at about the middle of 102a's length, thus completing the main frame section. In alternate embodiments, the nexus point at which frame members connect can be at any optimal geometric position. The means with which frame member 102a connects to frame members 102 and 103 can be by screws, brackets, welds, pins, pivots, slides, or any other suitably strong means. Additionally, member 102a can be made out of metal, plastic, or any other similarly strong material.

FIG. 3a. illustrates that wheel members 105 are attached at or around the junctions of frame members 101 and 102, and near the end of 101b. In alternate embodiments, front wheel placement can be oriented independently to either member 101, 101b or 102 respectively. The rear wheels 105 extend along with member 101b, as it extends to form the rear base member. In the present embodiment, wheel members 105 can rotate freely 360 degrees along the axis, as on, e.g., a swivel. In alternative embodiments, the wheels can have other degrees of rotational freedom.

FIG. 3a. illustrates extendable handle member 102b, cable member 120, cable connection point 121(a and b), and pulley members 122, which, in addition to extendable base member 101b, comprise the means with which the rear base member is extended. Handle member 102b moves parallel to member 102a. In a preferred embodiment, this sliding motion is accomplished by making handle member 102b fit telescopically within 102a. In alternative embodiments, 102b slides next to 102a, as though with rails, slots, slides, or other guides, or may fit inside of 102b. In yet other embodiments, handle member 102b comprises multiple pieces and telescopes within itself to contract and extend. Cable connection point 121a is attached at a point along the length of handle member 102b, and cable connection point 121b is attached at a point along the length of 101b. FIG. 5a. additionally illustrates cable member 120, which is the primary mechanism through which the rear base member is engaged and disengaged. Cable member 120 is threaded through or alongside frame members 101b, 103, 102a and 102b, and is additionally threaded through pulley members 122 in order to connect connection points 121. FIG. 5a. illustrates pulley members 122 as being located near the junctions of members 103 and 102a, and members 103 and 101b, respectively. Cable member 120 can be made out of metal or some other similarly strong material. The pulley members 122 assist cable member 120 to move smoothly within the frame of the stroller 100. In alternative embodiments, pulley members 122 may be located at different points within the frame of the stroller, or may be some similarly suitable device for assisting cable member 120 to move smoothly within the frame of the stroller. Pulley members 122 can be made out of plastic, metal, or any other suitably strong material.

FIG. 3a. illustrates extendable handle member 102b in a substantially retracted position. When member 102b is in a retracted position, the rear cargo area is not engaged; when member 102b is extended by the user, member 101b extends via cable member 120, connection point members 121 and pulley members 122, thus extending the rear base member 101b. Additionally, when fully extended, handle 102b and member 101b selectively lock into place, so that the rear base member 101b and handle 102b are selectively secured to stroller 100. Attached to the end of handle member 102b is handle 119. Handle 119 can be have a variety of possible shapes; with its design not being limited to any particular curved or straight shapes, and in alternative embodiments may be designed as two separate left and right handles, attached to mirrored members 102b. This handle 119 can be made out of plastic, metal, or any other suitable material, and may additionally be wrapped in foam, rubber, fabric, or any other suitable padding material.

In the present embodiment, members 102b and 101b are extended manually via cable member 120, in alternative embodiments, some other mechanical device may be used to automatically extend members 102b and 101b. In yet other alternative embodiments, springs or some other similarly suitable means to store and release potential energy may be attached to member 102b or member 101b to assist the user in engaging the rear base member.

Figure 3B:
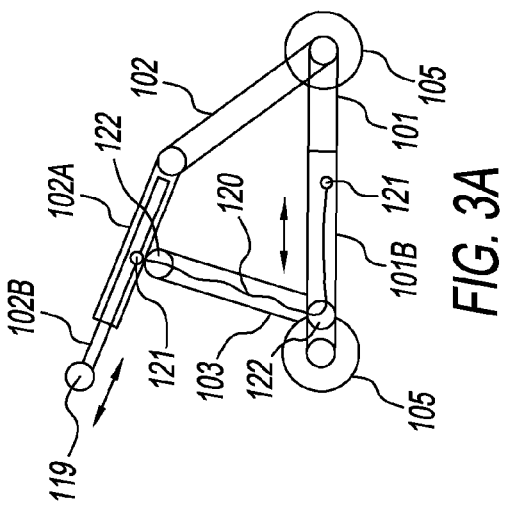
FIG. 3b. illustrates a side elevational view of an alternative embodiment of the stroller, in which the rear member is in the process of being expanded.

FIG. 3b. illustrates a stroller 100 in accordance with the teachings of the present invention, shown at a side elevational view, with members 102b and 101b beginning to be extended to form the rear base member.

Figure 3C:
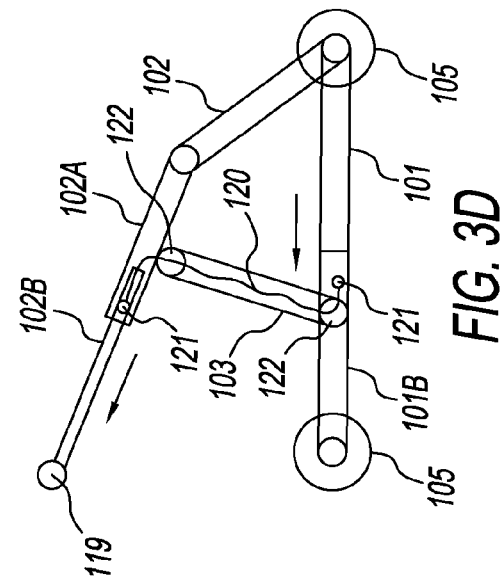
FIG. 3c. illustrates a side elevational view of an alternative embodiment of the stroller in which the rear member is shown being further expanded.

FIG. 3c. illustrates a stroller 100 in accordance with the teachings of the present invention, shown at a side elevational view, with members 102b and 101b being extended further, so that the rear base member is almost fully engaged.

Figure 3D:
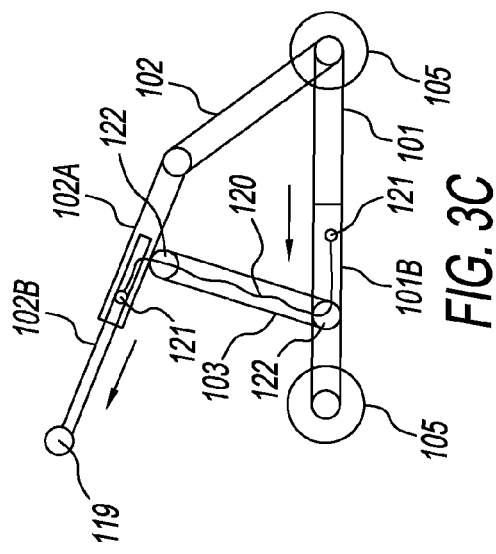
FIG. 3d. illustrates a side elevational view of an alternative embodiment of the stroller in which the rear member is shown fully expanded.

FIG. 3d. illustrates a stroller 100 in accordance with the teachings of the present invention, shown at a side elevational view, with members 102b and 101b in a fully extended and locked position, so that the rear base member is fully engaged.

Figure 4:
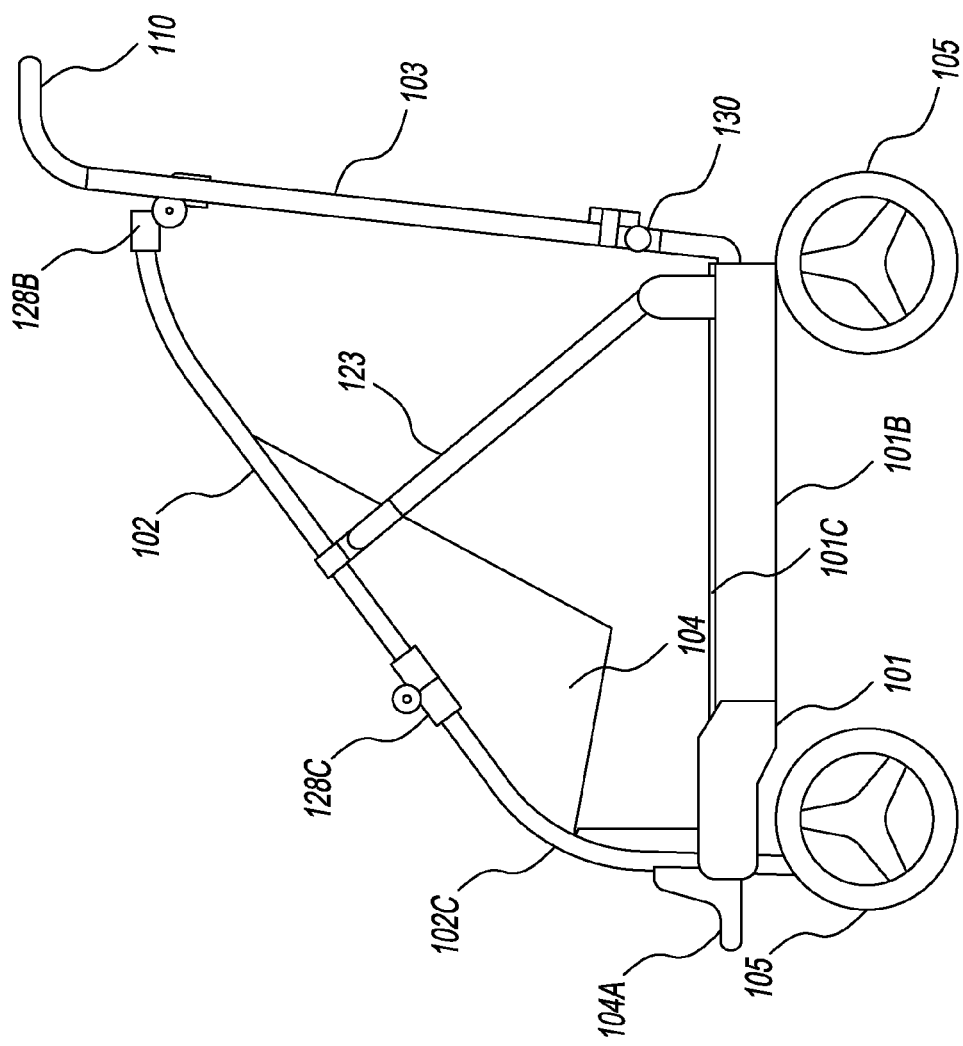
FIG. 4 illustrates a side elevational view of an alternative embodiment of the stroller, in which the rear member is not expanded, in which an expandable frame member is engaged via sliding support members and joint members.

FIG. 4 illustrates a stroller 100 in accordance with the teachings of the present invention, shown at a side elevational view, with the rear base member 101b not engaged, with alternative embodiments in some of the members. Importantly. the stroller 100 illustrated in FIG. 4 has a folding capability (see FIGS. 10-11). The stroller 100 is folded via joint locking member 130, and 128a, and 128b. Release of locking joint 130 allows member 103 to fold forward (see FIG. 10-11). Release of joint member 128a, allows members 102 and 102c to fold downward (see FIGS. 12-13). In alternative embodiments, this folding capability may not be present. Frame member 103, seat member 104, and wheel members 105 are functionally identical to those illustrated in FIGS. 1-2 and seat member 104 is mounted to members 102. Additionally, front frame base members 101 and 101b are functionally identical to those illustrated in FIGS. 3a-d. FIG. 4 illustrates diagonal frame member 102, the top of which is connected to a joint member 128b (see FIG. 6), and the bottom, or a section substantially near the bottom, of member 102 being connected to joint member 128a. FIG. 4 also illustrates diagonal frame member 102c, the top of which is connected to joint member 128a, and the bottom, or a section substantially near the bottom, of member 102c is connected to member 101. Joint member 128a allows frame members 102 and 102c to move from an unfolded position (see FIG. 6) to a folded position (see FIGS. 10-11). Joint members 128a and 128b can be made out of plastic, metal, or any other suitably strong material. FIG. 4 introduces diagonal support frame member 123. The top of diagonal support frame member 123 is connected with a slide somewhere along frame member 102, in such a way as to allow it to slide along member 102; the bottom of member 123 is connected at, or substantially near, the rear end of base frame member 101. In alternative embodiments, the points at which member 123 attaches to members 102 and 101 may be different, so long as member 123 is still able to provide structural support for the main frame of the stroller and to slide during folding. In yet another embodiment, the top of member 123 may be attached to member 102c, instead of member 102. The means with which member 123 attaches to members 102 (or 102c) and 101 can be by slots, screws, clamps, brackets, pins, slides or any other similarly suitable means. Additionally, member 123 can be made out of metal, plastic, or any other suitably strong material. FIG. 4 additionally illustrates footrest member 104a, which is attached near or substantially near the front end of base frame member 101. In alternative embodiments, member 104a may be placed at a different location on the frame of the stroller, or may be connected to seat member 104. Additionally, member 104a can be made out of plastic, metal, or any other similarly suitable material, and may additionally be wrapped in foam, rubber, fabric, or some other padding material.

Figure 5:
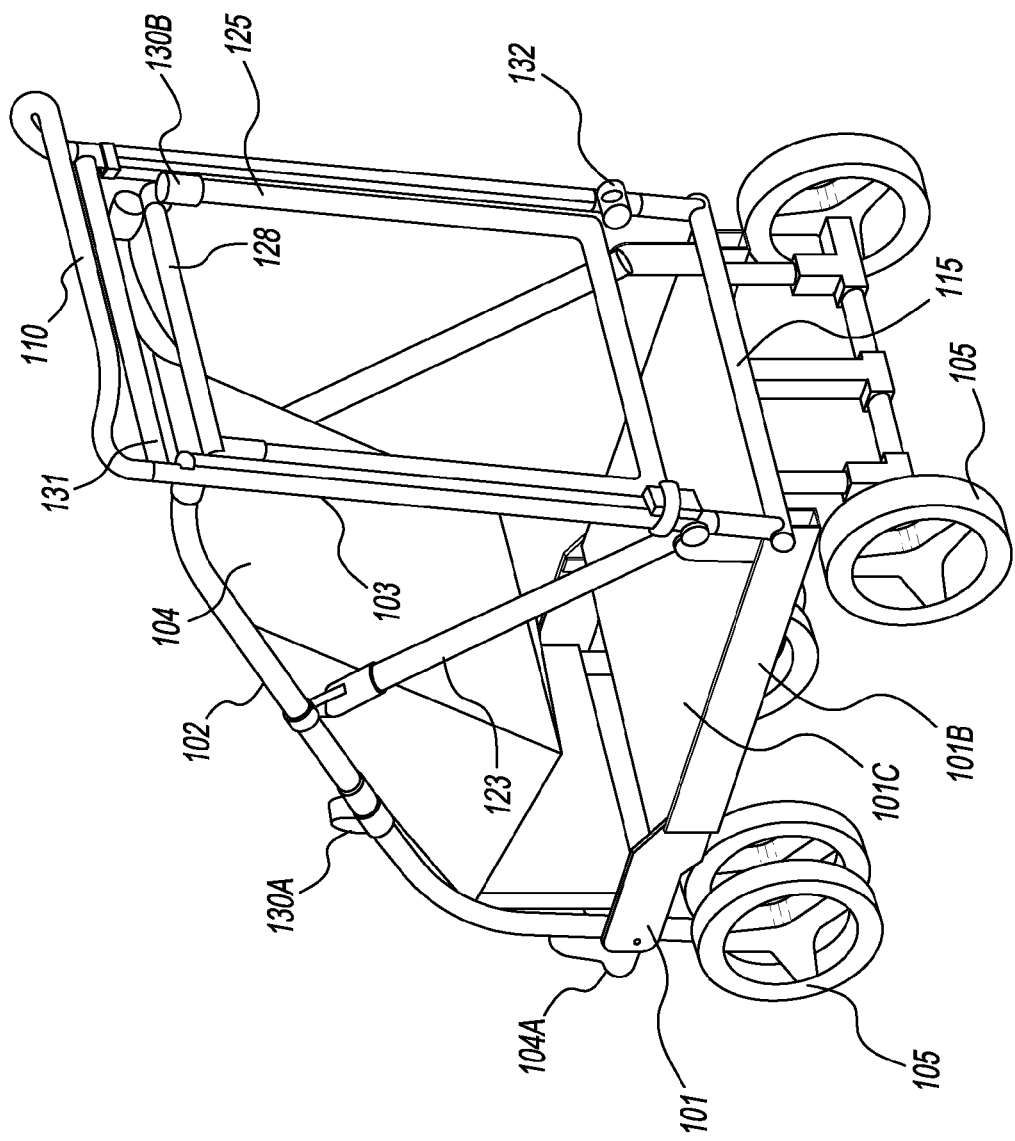
FIG. 5 illustrates a rear perspective view of an alternative embodiment of the stroller as illustrated in FIG. 11, in which the rear member is not expanded.

FIG. 5 illustrates a stroller 100 in accordance with the teachings of the present invention, shown at a rear perspective view. FIG. 5 illustrates cross members 115 and 128; FIG. 5 additionally illustrates extendable support member 125. In the current embodiment, member 125 is a three-sided, u-shaped tube. In alternate embodiments, 125 may be parallel tubes connected between the frame members 102 (through joint 128b) and 103 without a third tube crossmember. In this embodiment, extendable support member 125 and expandable base frame member 101b are the primary means with which the rear cargo area is engaged (see FIG. 8). In the un-engaged position, the top, or a portion substantially near the top, of extendable bar member 125 is connected to joint member 128b; the bottom, or a portion substantially near the bottom, of member 125 is connected to frame member 103 in such a way as to allow it to slide vertically along member 103 and to pivot about that same point. Member 125 is able to move from a closed, substantially vertical, position, to an open, substantially horizontal, position by sliding the base of the u shape vertically along member 103. As member 125 is lifted along member 103, it is pushed to a substantially horizontal position (see FIG. 10) via joint members 128b. This creates a new distance between 102 and 103, which simultaneously causes base member 101b to move parallel to 101 to extend the base of the frame (see FIGS. 6 and 7). which simultaneously expands member 101b, and thus engages the rear cargo area. In alternative embodiments, there may be springs, pulleys, motors, or some other mechanism which assists the user of the stroller 100 to expand members 125 and 101b. In alternate embodiments, member 125 may have additional expansion capabilities beyond pivoting upward, such as expanding telescopically while also pivoting into an expanded position, or expanding via hinges. When member 125 is in a closed position, it locks into position. The means with which member 125 locks into place can be by pin, snap, strap, slot, clamp or any other similarly suitable method. Additionally, member 125 can lock into place at various intervals along the height of 103, to provide for variable expansion. The means with which member 125 locks into place can be by pin, snap, strap, slot, clamp or any other similarly suitable method. Support member 125 can be made out of metal, plastic, or any other similarly strong material.

Figure 6:
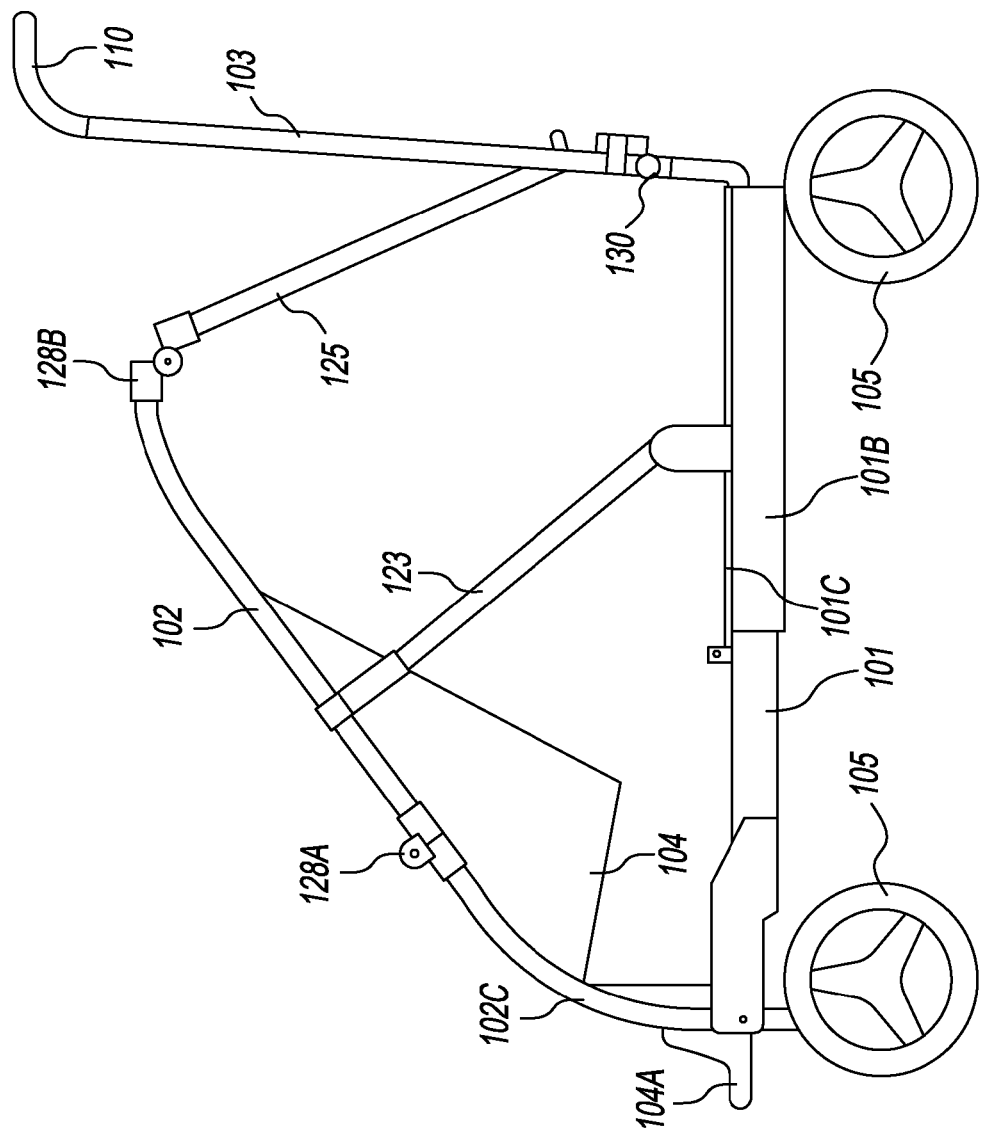
FIG. 6 illustrates a side elevational view of an alternative embodiment of the stroller as illustrated in FIG. 11, in which the rear member is in the process of being expanded.

FIG. 6 illustrates a stroller 100 in accordance with the teachings of the present invention, shown at a side elevational view, with members 125 and 101b in the process of being extended to form the rear cargo area. As discussed above, in some embodiments, member 125 may lock in an intermediate position along the height of 103, thus achieving variable expansion of the base. In another embodiment, the total movement of member 125 may be limited to an intermediate position, with member 125 serving as side frame members once the extendable base has selectively expanded.

Figure 7:
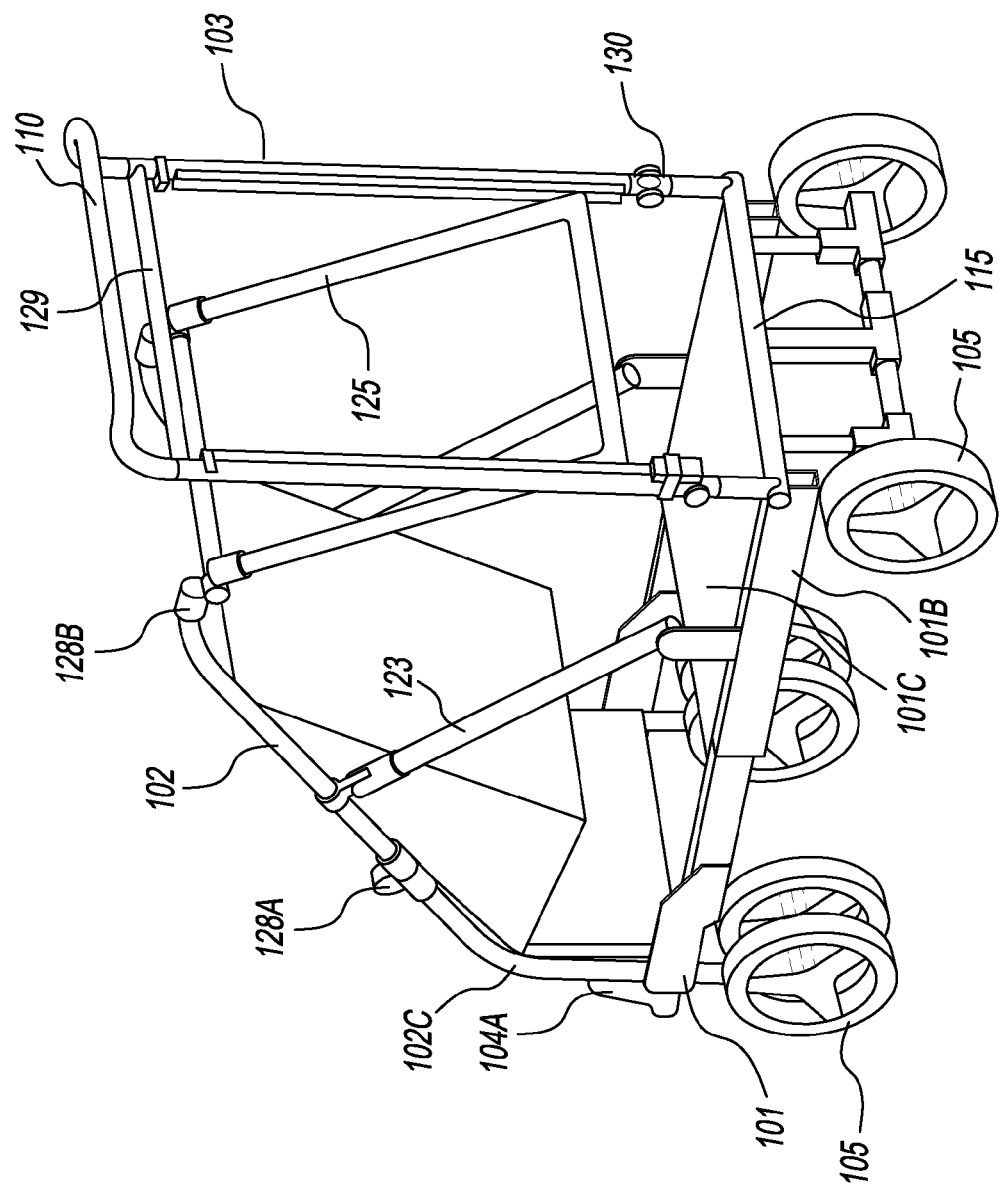
FIG. 7 illustrates a rear perspective view of an alternative embodiment of the stroller as illustrated in FIG. 11, in which the rear member is in the process of being expanded.

FIG. 7 illustrates a stroller 100 in accordance with the teachings of the present invention, shown at a rear perspective view, with members 125 and 101*b* being extended to form the rear cargo area.

Figure 8:
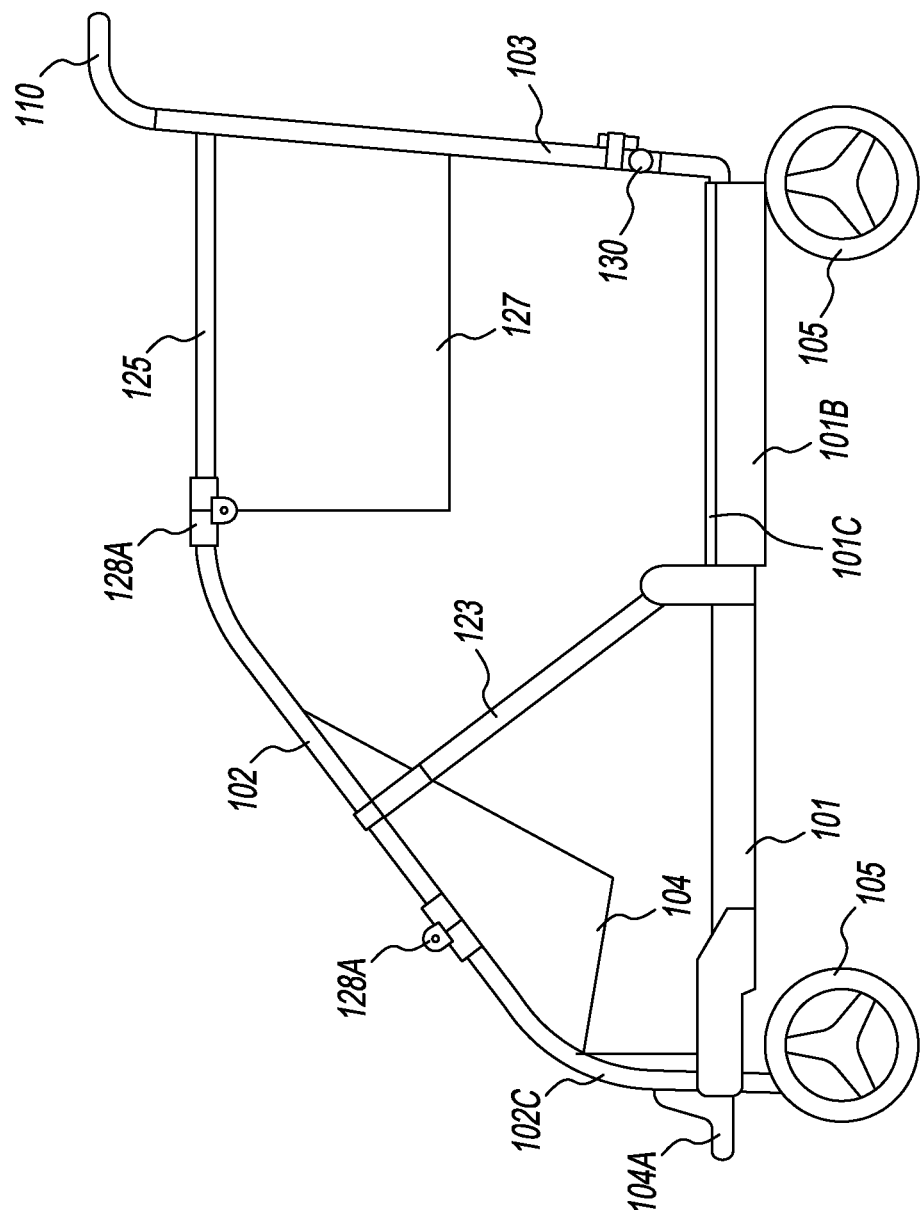
FIG. 8 illustrates a side elevational view of an alternative embodiment of the stroller as illustrated in FIG. 11, in which the rear member is fully expanded.

FIG. 8 illustrates a stroller 100 in accordance with the teachings of the present invention, shown at a side elevational view with the rear cargo area fully extended. FIG. 8 additionally illustrates basket member 127, the top of which attaches to member 125, the front of which attaches to member 128, and the back of which attaches to member 103. In alternate embodiments, basket member 127 may attach at or near any frame member, joint, pivot or hub in which attachment renders the basket to a usable state. Member 127 can be made out of fabric or some other similarly soft material, or may additionally be made out of plastic or some other similarly rigid material. Member 127 attaches to the frame of the stroller by snaps, straps, or any other similarly suitable means of attachment.

Figure 9:
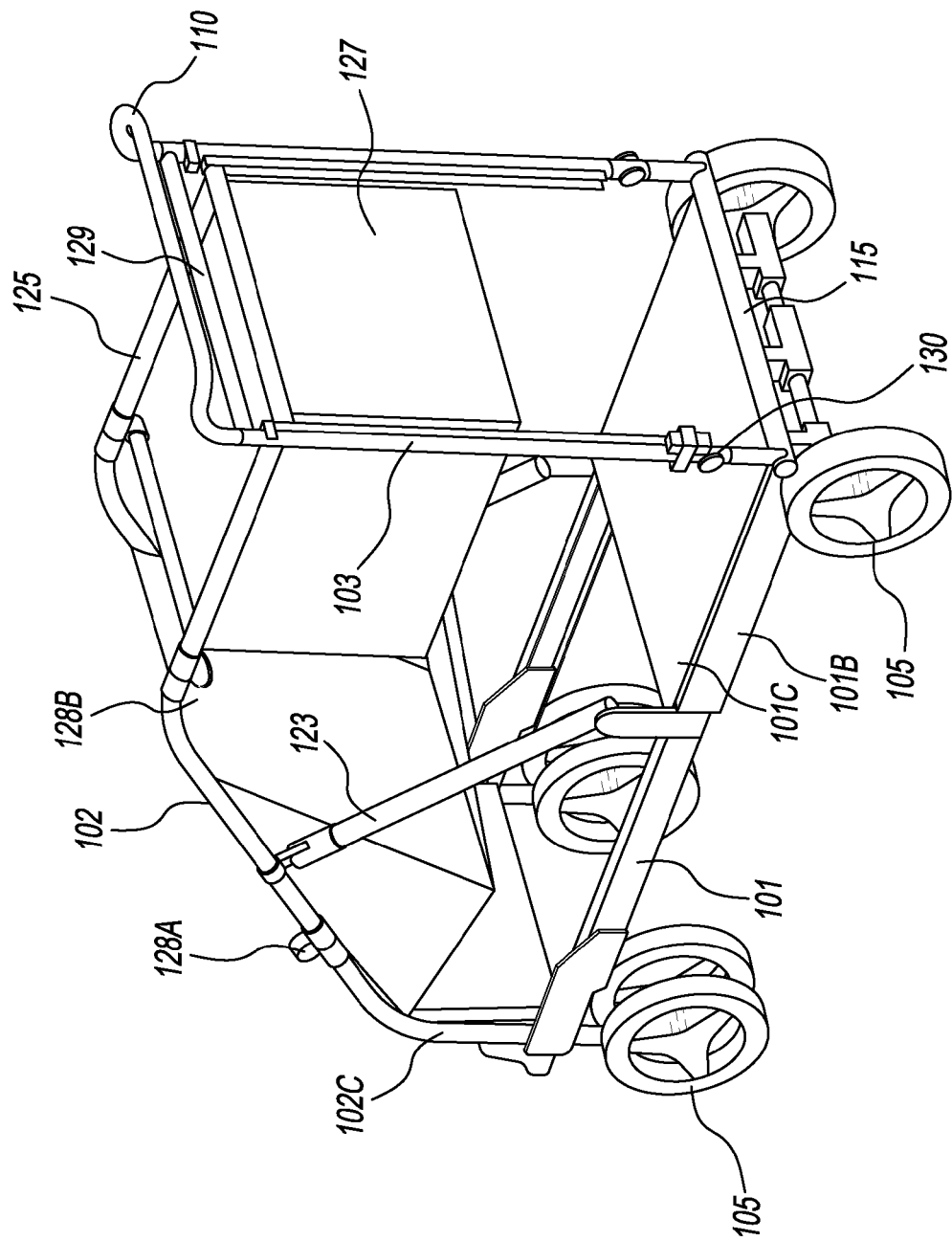
FIG. 9 illustrates a rear perspective view of an alternative embodiment of the stroller as illustrated in FIG. 11, in which the rear member is fully expanded.

FIG. 9 illustrates a stroller 100 in accordance with the teachings of the present invention, shown at a rear perspective view, with the rear cargo area fully engaged.

Figure 10:
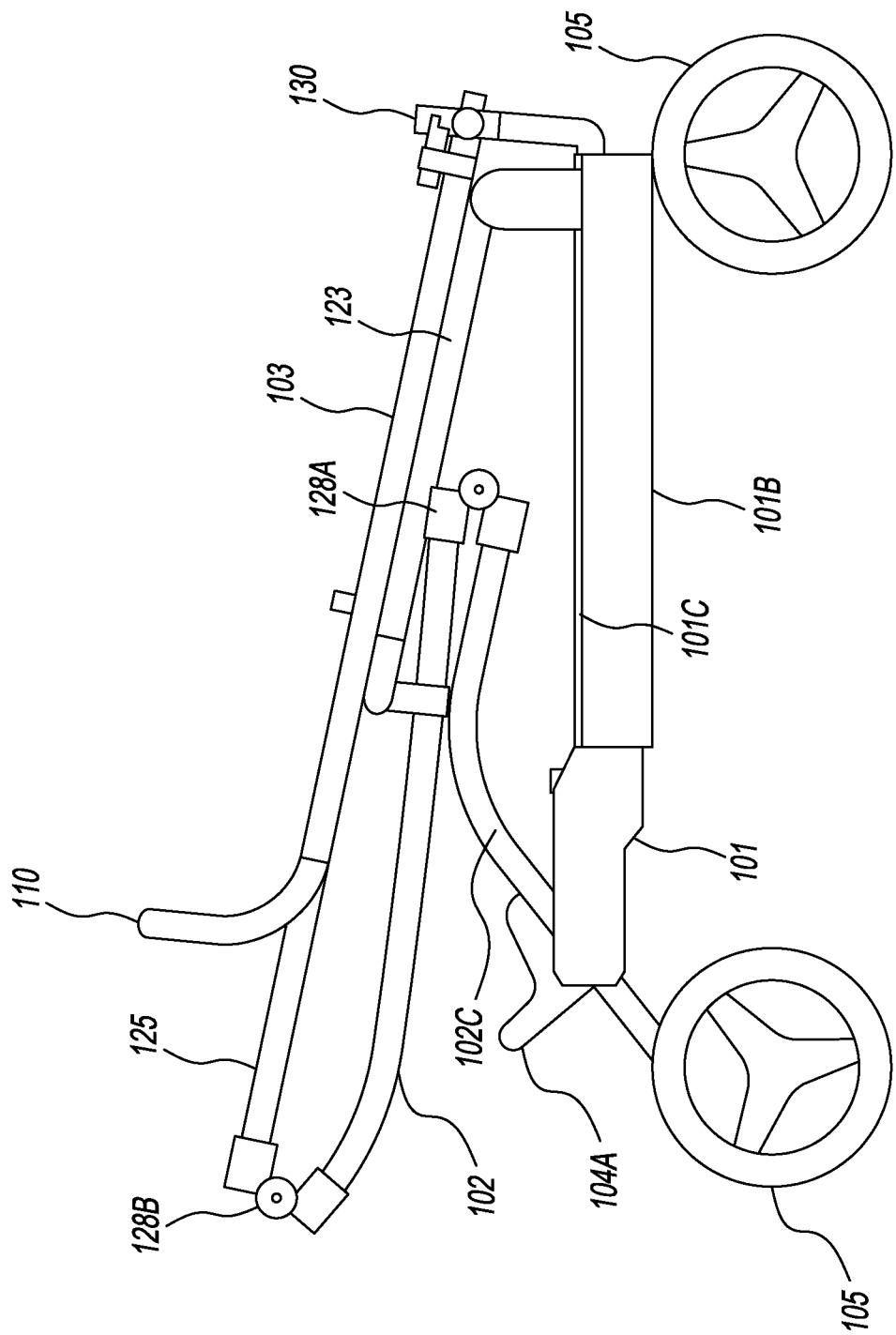
FIG. 10 illustrates a side elevational view of an alternative embodiment of the stroller as illustrated in FIG. 11, where the stroller is in a folded position.

FIG. 10 illustrates a stroller 100 in accordance with the teachings of the present invention, shown at a side elevational view in a folded position. The stroller is folded by releasing joint members 130 via a release mechanism, which allows frame member 103 to fold forward to a substantially horizontal position. Additionally, joint members 128*a* and 128*b* allows frame members 102 and 102*c* to fold downward, thus allowing member 103 to fold fully forward. The mechanism with which joint members 130 are released can be a button, spring, latch, or any other similarly suitable method.

Figure 11:
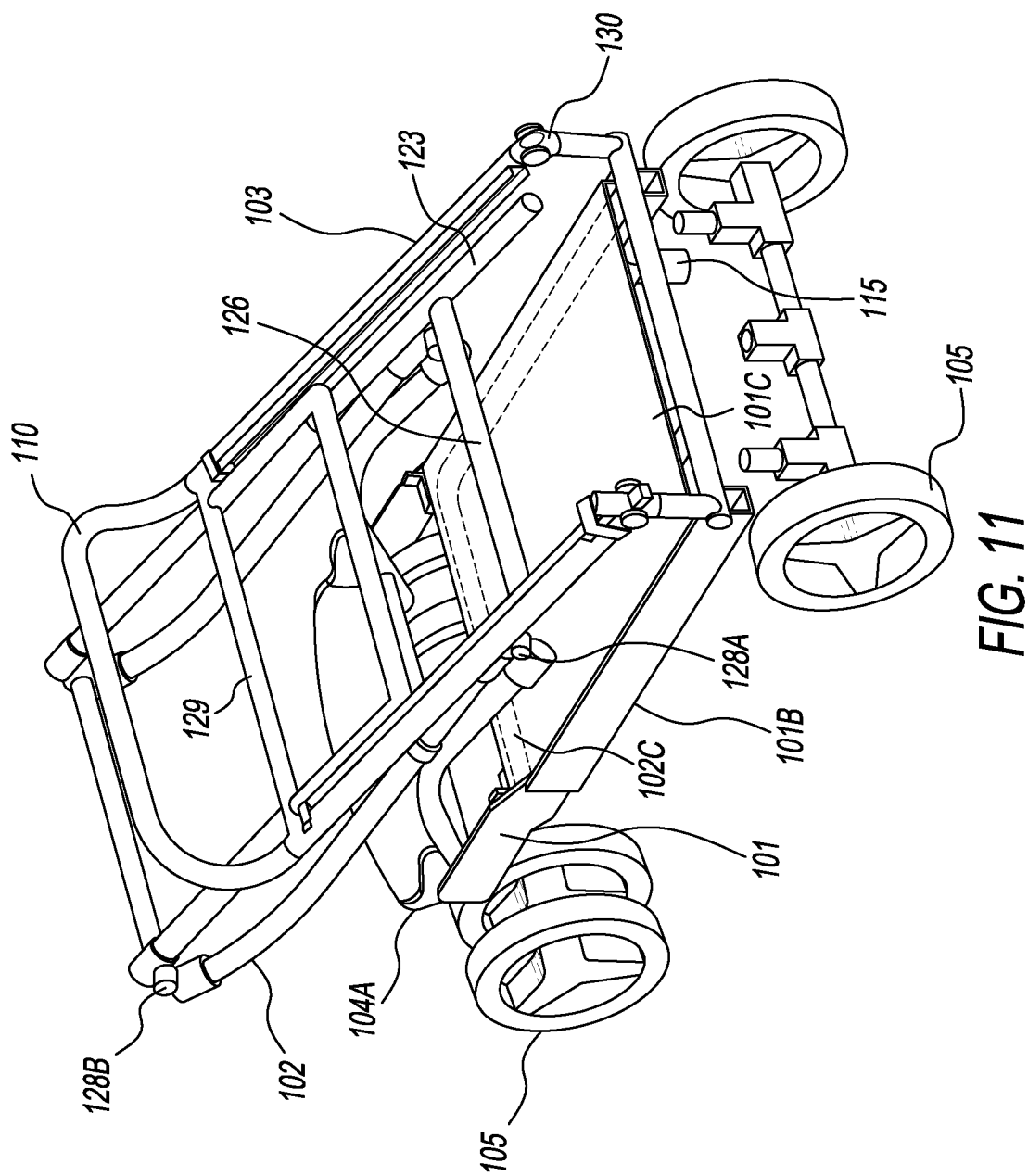
FIG. 11 illustrates a rear perspective view of an alternative embodiment of the stroller as illustrated in FIG. 11, where the stroller is in a folded position.

FIG. 11 illustrates a stroller 100 in accordance with the teachings of the present invention, shown at a rear perspective view in a folded position.

Figure 12:
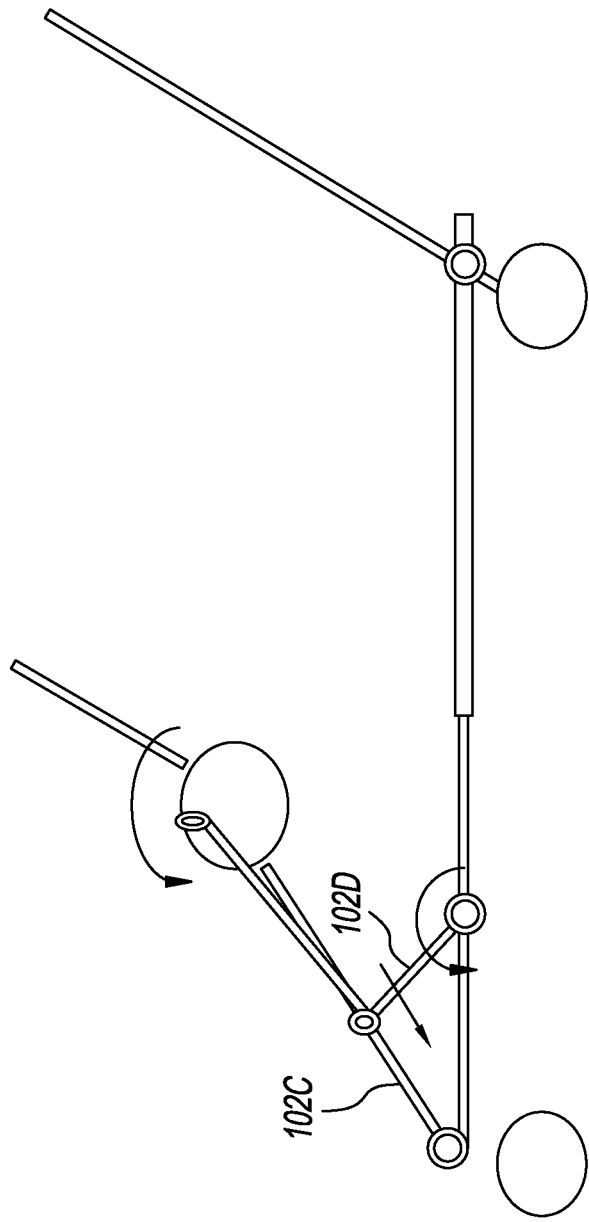
FIG. 12 illustrates an alternative embodiment of the stroller having selectively foldable front frame members.

In addition to the foregoing embodiments, the present invention contemplates other specific exemplary alternative embodiments. For example, FIG. 12 illustrates a specific alternative embodiment of a stroller 100 that provides selectively foldable front frame members 102/102C in which the members are rotatably jointed to create a top portion 102 and a bottom portion 102C of each front member. An actuator, such as a cable arrangement connected to the rotatable joint of each front member, effects folding of the front members upon actuation. Specific exemplary embodiments further provide a rotatable, front member 102C extending from bottom frame member 101 which is slidably coupled to support member 102D, and from which the support member also rotatably pivots to provide support while still allowing the front members to be selectively folded or deployed. Additional specific exemplary embodiments further provide that member 102C may have a shock or damper system.

FIG. 13 illustrates an alternative embodiment of a stroller 100. Specific exemplary embodiments provide the rear cargo area with a foldable child seat 210 that is selectively detachable from the rear cargo area. For embodiments which provide floor platform 101C, platform 101C provides a floor upon which a child may step up to access the chair, or stand, as the case may be. For safety and other considerations, specific exemplary embodiments of the stroller, platform 101C is cropped to extend less than the full length of member 101B.

Figure 14:
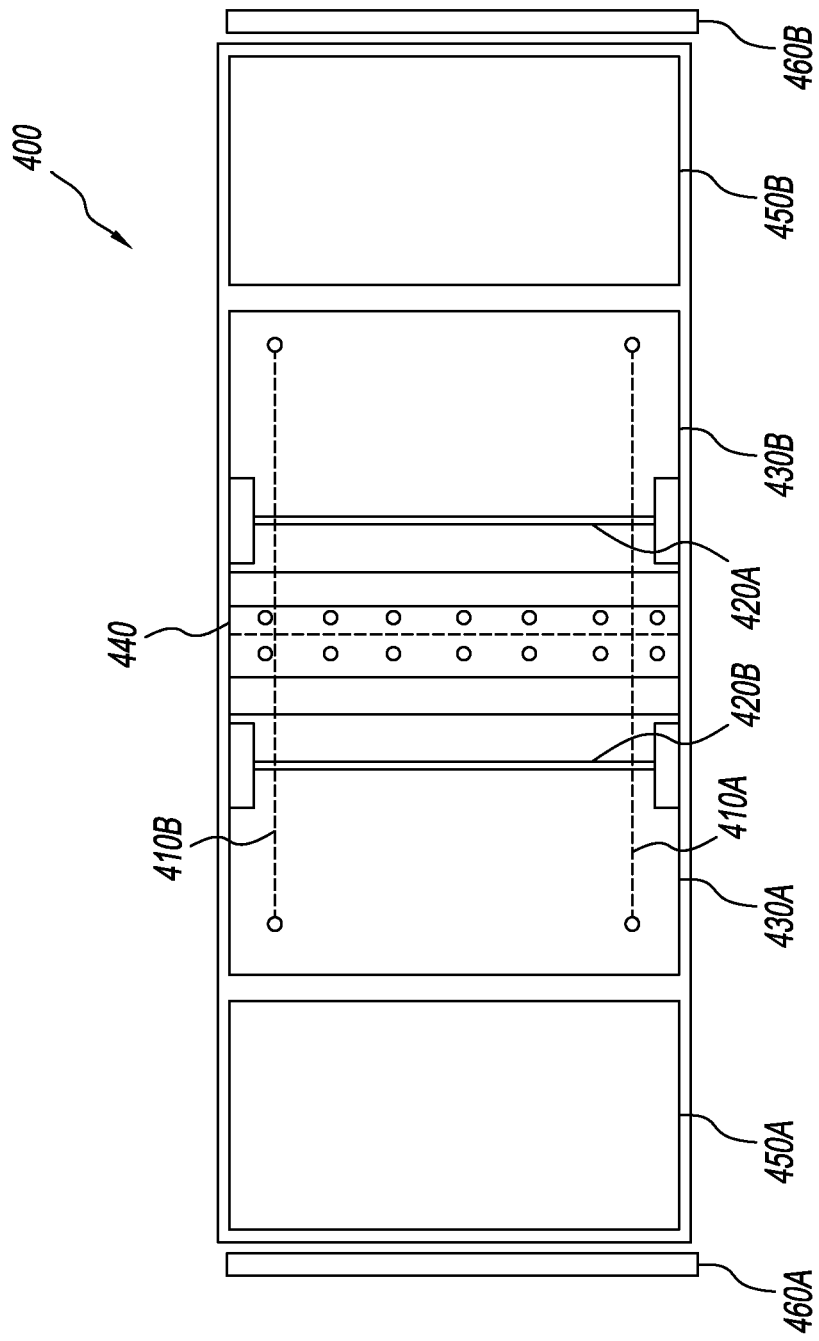
FIG. 14 illustrates a specific alternative embodiment of a basket for the stroller.

FIG. 14 illustrates an alternative embodiment of basket 127. Another specific alterative embodiment provides a selectively foldable basket 400 that is selectively mountable to handle 110, front frame member 102, rear frame member 103, support member 125, or rear cargo area platform 101C_. Specific exemplary embodiments of basket 400 have one or more elastic members 410A, 410B which mount to 430A & 430B respectively, and which are held in place by restraints 420A and 420B, which combined cause basket 400 to snap into a more compact position when the basket is folded. Base panels 430A, 430B pivot around hinge 440. Side Panels 450A, 450B comprise the upper sides of basket 400. Members 460A, 460B provide a potential surface in which to mount basket 400 to stroller 100 frame members.

Figure 15B:
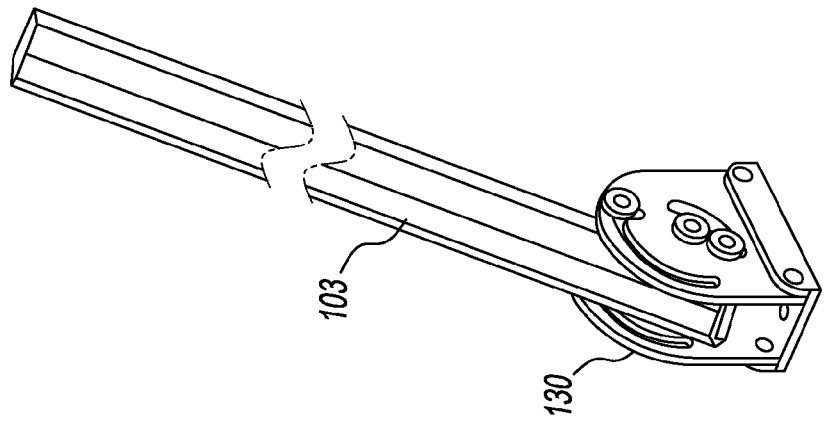
FIG. 15B illustrates the lock of FIG. 15A assembled.
Figure 15A:
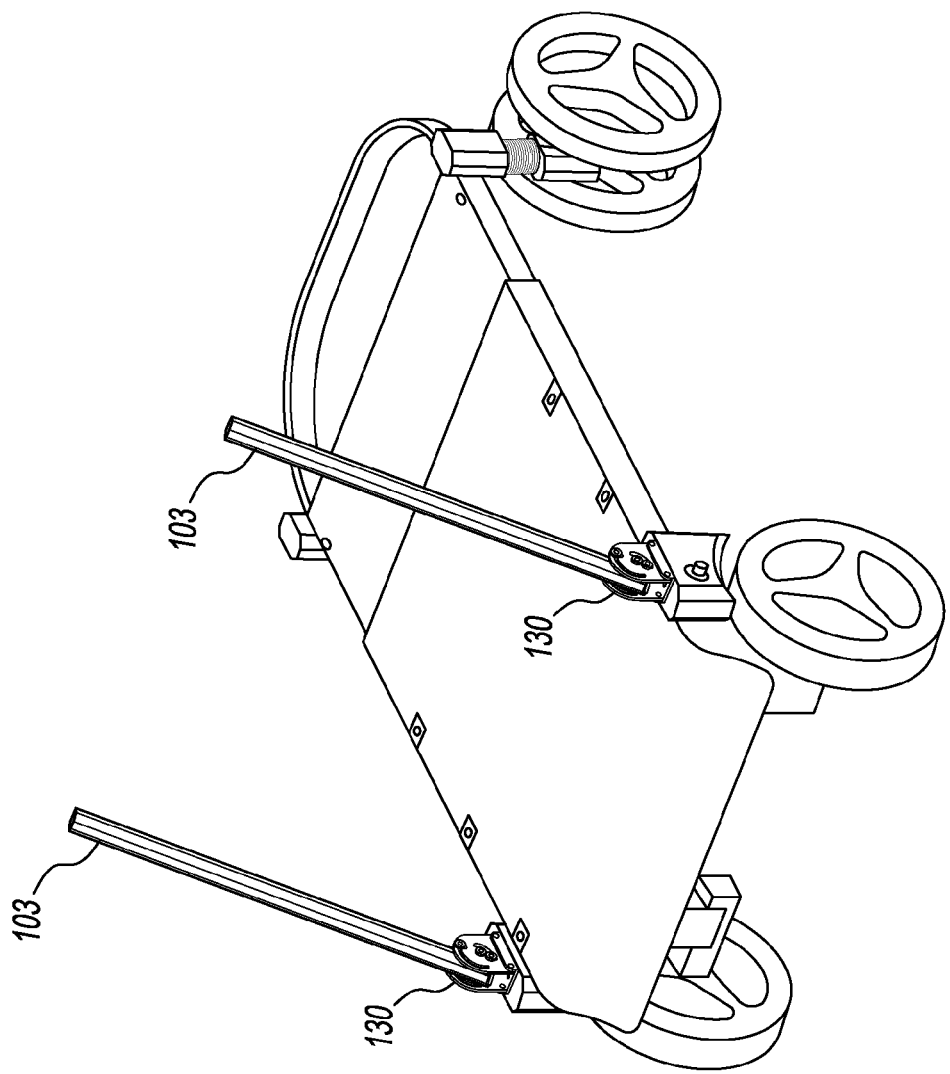
FIG. 15A illustrates a specific exemplary embodiment of a rear handle lock of the stroller.

FIG. 15A illustrates a specific exemplary embodiment of a rear handle lock 130 of a stroller 100. A lock 130 provides, for example, a mechanism consisting of rear frame member 103 (tube), pivot, locking pins, shuttle, locking plates, spring, spring stop, lock actuator, and cable. A rear frame member 103 has slots cut into it to allow limited travel of the pins up and down parallel to the handle and along the center plane of rear frame member 103. The pivot is a metal pin, for example, that facilitates rotational motion of the rear frame member relative to the locking plates. The locking pins provide the locking bar for restraining the rear frame member's rotation relative to the locking plates. The shuttle may be a plastic part, for example, that slides up and down inside the handle tube and couples the pins so they slide up and down at the same time. The shuttle is constantly pushed upon (downward) by a spring pushing the shuttle and pins into a locked position. The shuttle has a cable attached to it in which a lock actuator on or near the handle pulls the cable and hence moves the shuttle and pins to an unlocked state. The unlocked state is a state in which the pins are now inside the circular track of the locking plate and the rear frame member 103 can now be rotated freely to a non-use state (folded state). The locking plates may be mounted to lower frame member 101B and may be located on each side of the rear frame members 103. The locking plates may employ tracks or slide-by-slide translation and locking pockets for the pins to travel in. The pins may be spring loaded to lock into the locking pockets when the handle is rotated to the appropriate angle to line up with the locking pockets. Locking pockets may be designed for both a stowed (folded) state and erected (unfolded) state.

FIG. 15B illustrates lock 130 assembled.

Figure 15C:
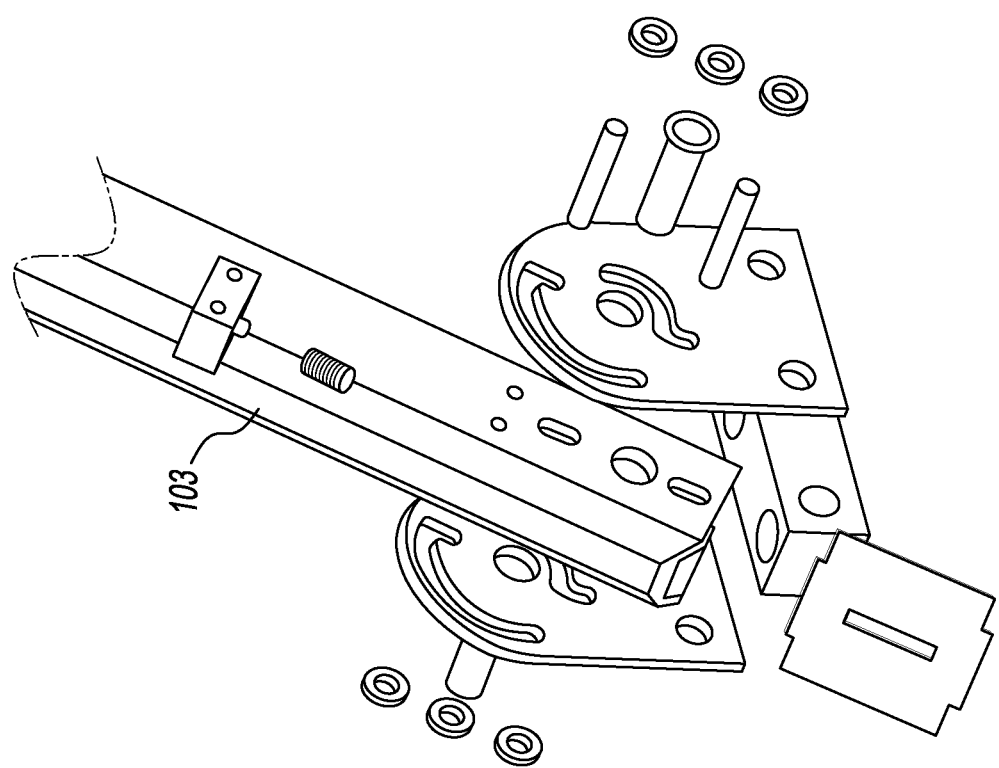
FIG. 15C illustrates the lock of FIG. 15B in an exploded view.
Figure 16:
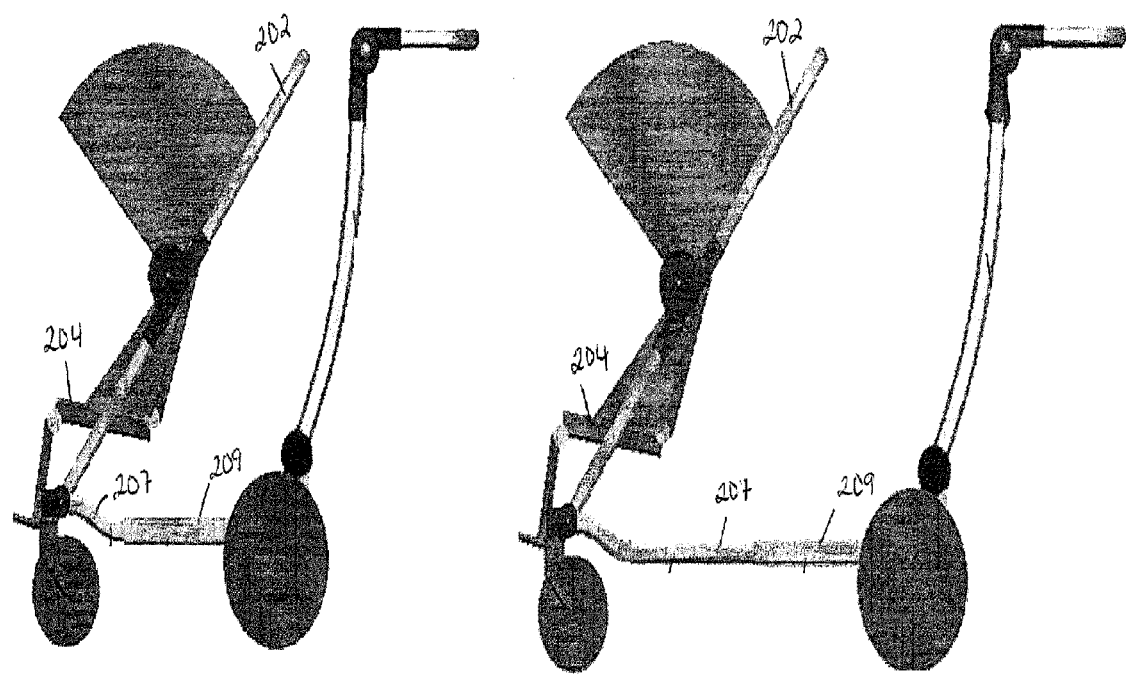
FIG. 16 is a diagrammatic illustration side view of a stroller of the present disclosure in a retracted position and an expanded position.
Figure 17:
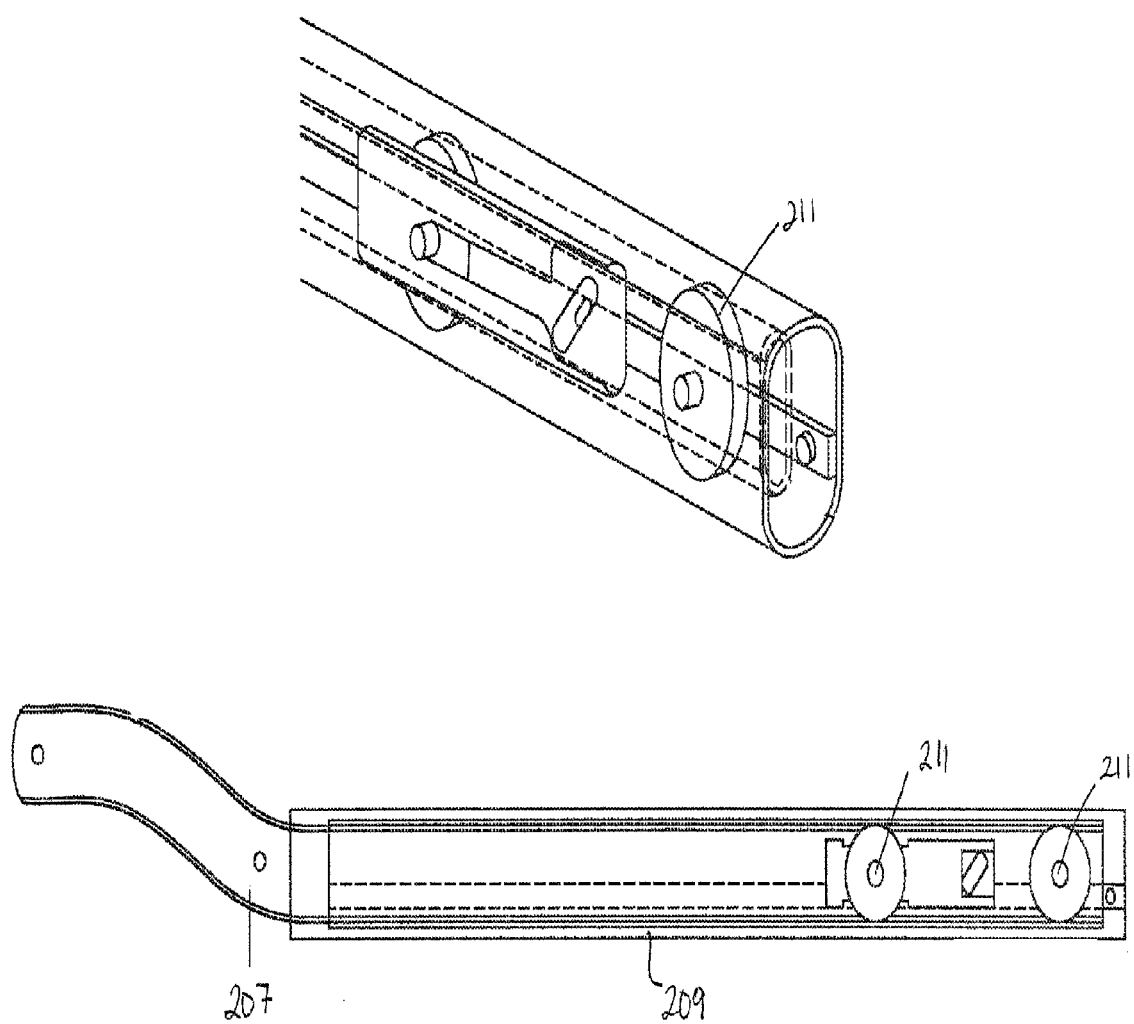
FIG. 17 provides various views of the telescopic members of a stroller of the present disclosure.
Figure 18:
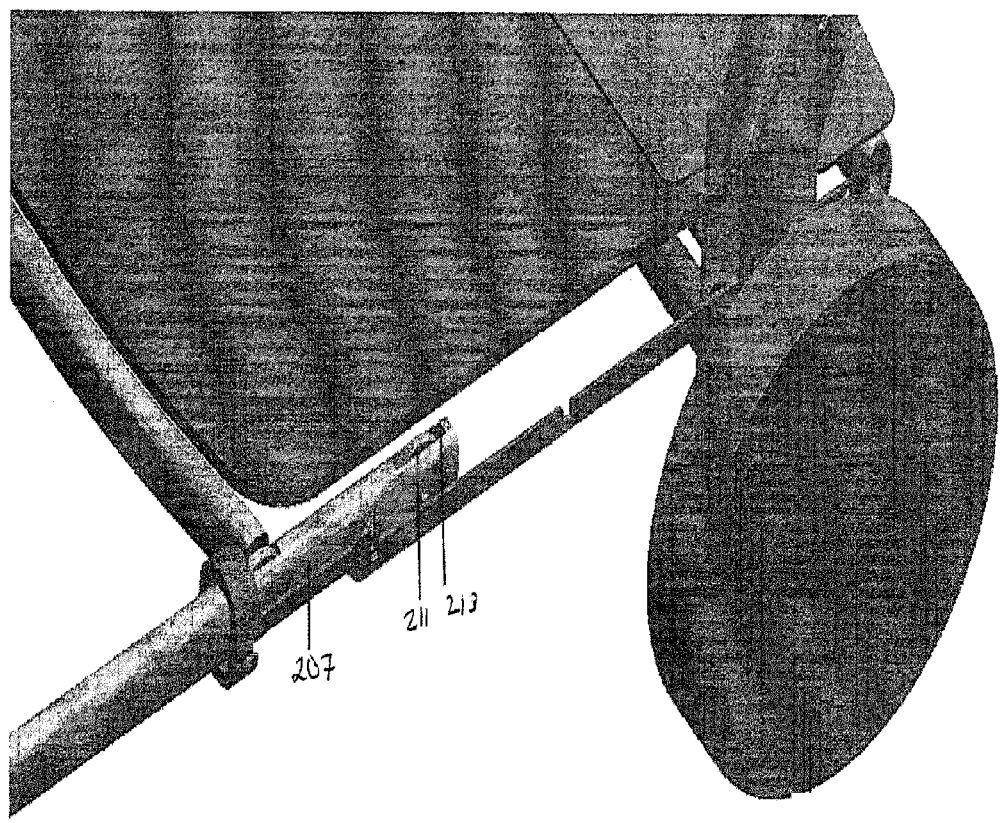
FIG. 18 is a diagrammatic illustration perspective view of a detail of the stroller of FIG. 1.
Figure 19:
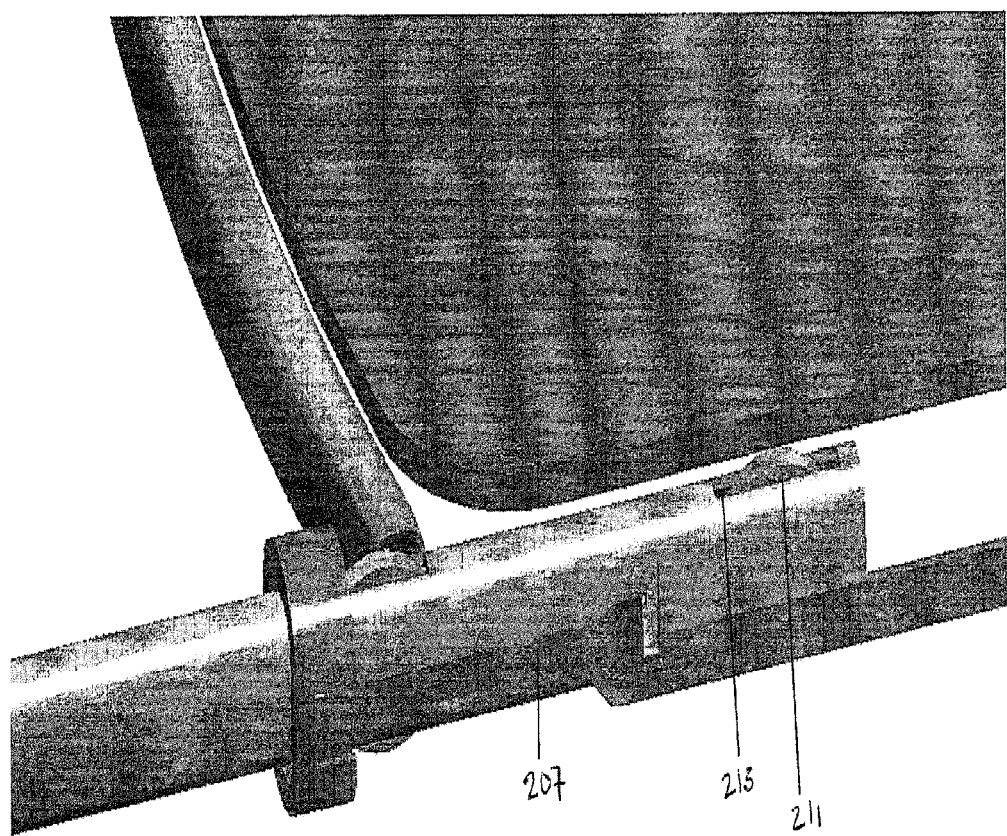
FIG. 19 is a diagrammatic illustration perspective view of a detail of the detail of FIG. 3.
Figure 20:
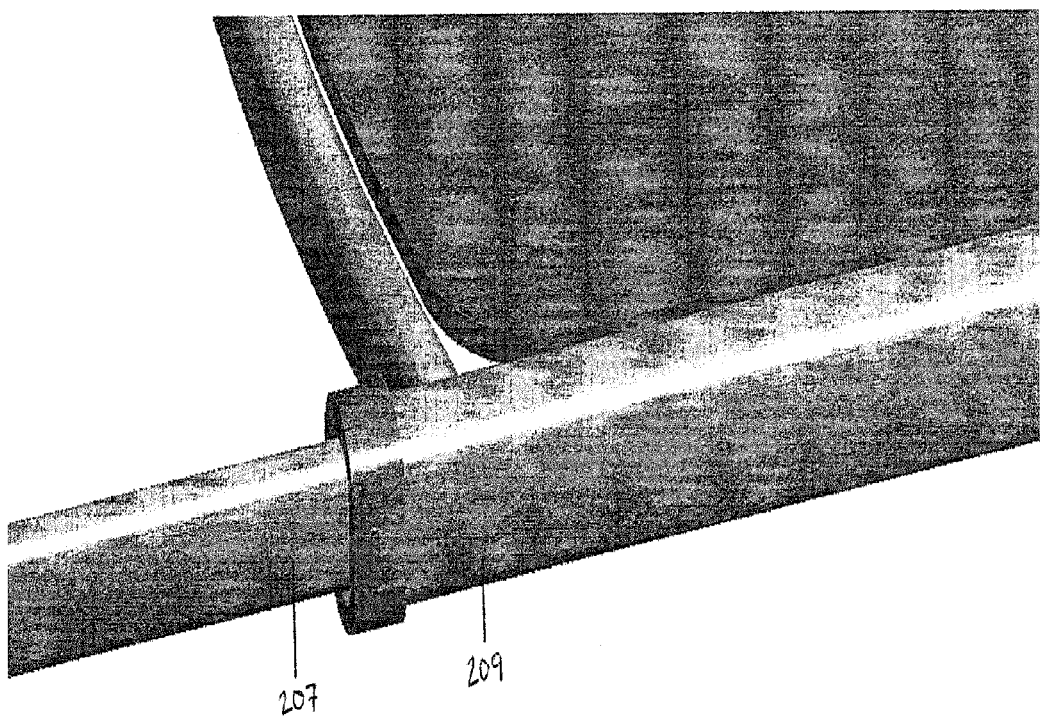
FIG. 20 is a diagrammatic illustration perspective view of a detail of the male and female telescoping members of a stroller of the present disclosure.
Figure 21:
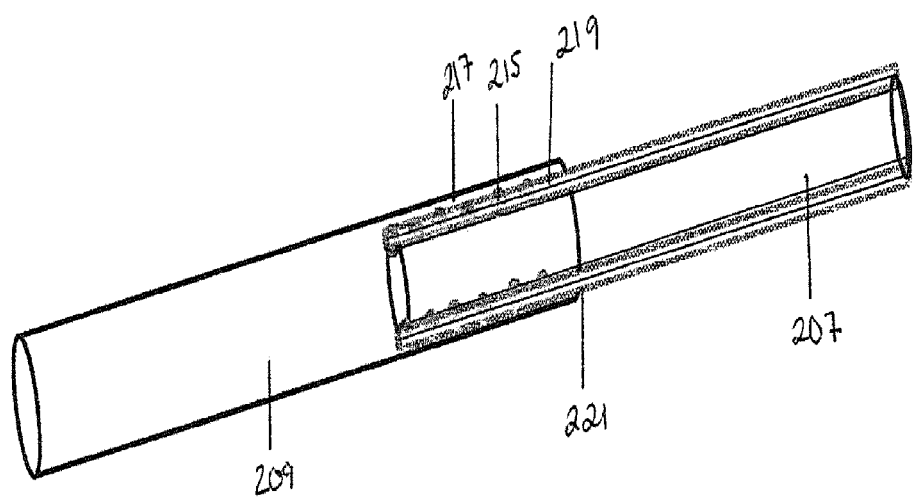
FIG. 21 is a diagrammatic illustration transparent view of a detail of the male and female telescoping members of a stroller of the present disclosure.

FIG. 15C depicts lock 130 in an exploded view.

In reference now to FIGS. 16-29:

Telescopic Tubing with Wheel: A pair of tubes in which one tube 207 is smaller in circumference than the other 209, and in which the smaller tube 207 houses at least one wheel 211, and in which the smaller tube 207 contains a slot 213 for the wheel 211 to make contact with interior of the larger tube 209. In general, the expandable stroller of the present invention comprises two mirror-imaged structural frames connected to each other by cross members. As the cross members may be placed in any suitable position, and since the structural frame members are mirror images, the discussion of the structure of the present invention will focus on a single frame. One skilled in the art will recognize that the description will apply equally to the mirrored frame.

Each pair of telescopic tubes are configured with at least one wheel (in this case the wheels have ball bearings). The ball bearings ease the movement from the retracted to expanded configurations.

Telescopic Tubing Expansion with balls: A pair of tubes in which one tube 207 is smaller in circumference than the other 209, and in which the smaller tube 207 includes at least a set of channels or depressed insets 219 on opposing upper/lower and/or left/right sides, and in which at least two or more balls 215 is set within the channels/insets 219 of the smaller tube 207 and the interior surface 217 of the larger tube 209, such that when the telescopic tubes move axially relative to each other, movement of the tubes is eased by means of the balls. The interface 221 between the larger 209 and smaller 207 tubes (as well as the tube ends), is preferably sealed in a way to prevent infiltration of dirt and debris.

Telescopic Tubing Lock Mechanism: A pair of tubes in which one tube 207 is smaller in circumference than the other 209, and in which the smaller tube 207 slides relative to the larger tube 209, and in which the smaller tube 207 is locked in a fixed position relative to the larger tube 209 by means of a pin or rod 509 engaging into a tab or slot 513 with a spring mechanism holding the pin/rod into a locked position, and in which releasing tension of the spring disengages the pin/rod from the tab/slot, thus allowing the tubes to slide relative to one another, and in which the design may embody two or more locking positions (tabs and/or slots). Releasing tension on the spring and pin/rod is achieved by pulling cables and/or a secondary mechanism which acts upon the spring. In one embodiment, the spring is located within the place for a spring 503 depicted in FIG. 25.

The telescopic tubes each have a locking mechanism, which is actuated at the upper frame 202 of the stroller's front seat 204. To actuate the cables/locks, the user slides the secondary lock with their thumb and then squeezes the actuation lever. The actuation lever pulls cables on both the right and left sides to release the locks simultaneously. The lock utilizes a spring that is predisposed to stay locked. The cables release tension on the spring, allowing the lock to release.

Figure 23:
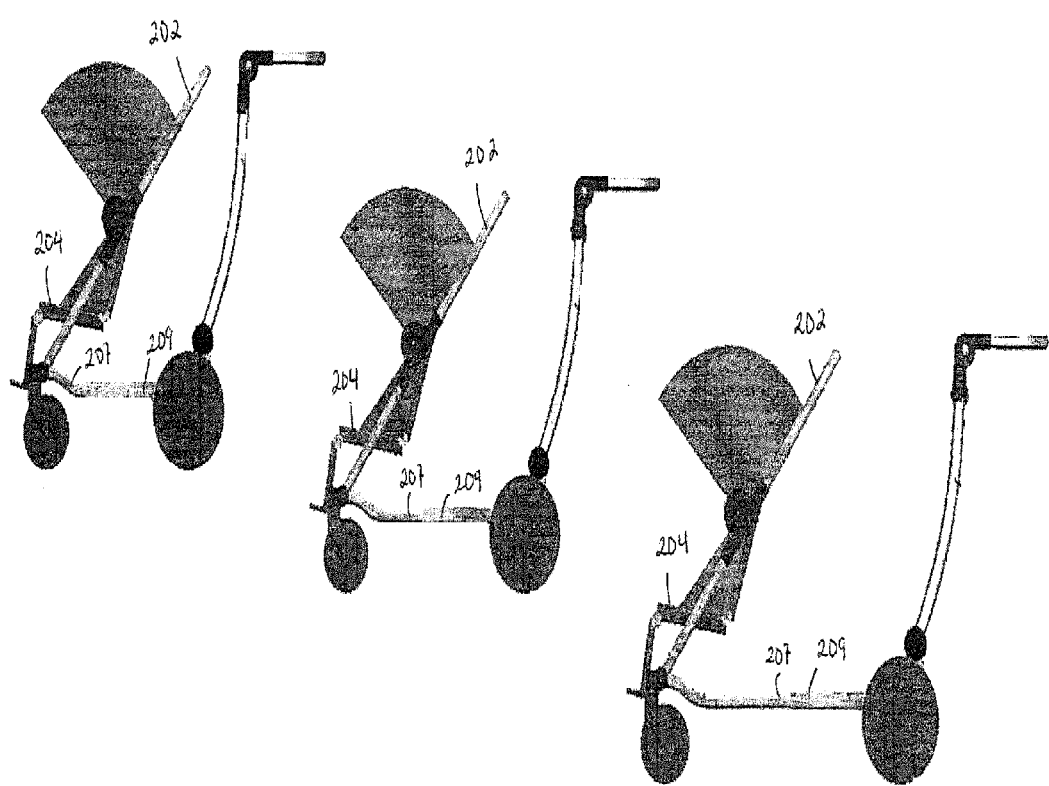
FIG. 23 is a diagrammatic illustration side view of a stroller of the present disclosure with the base in a retracted position, intermediate position, and an expanded position.
Figure 24:
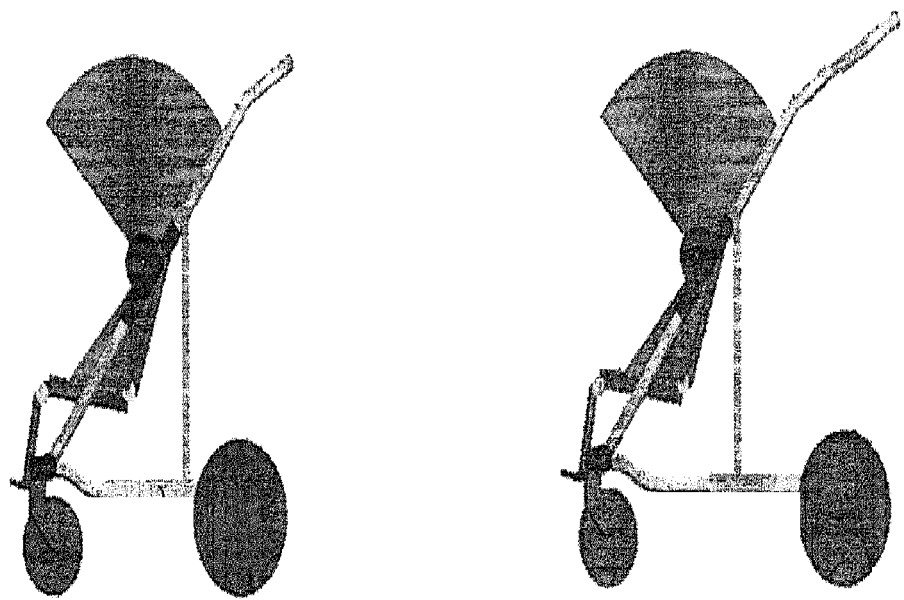
FIG. 24 is a diagrammatic illustration side view of a stroller of the present disclosure with the handle members in a retracted position and an expanded position.
Figure 25:
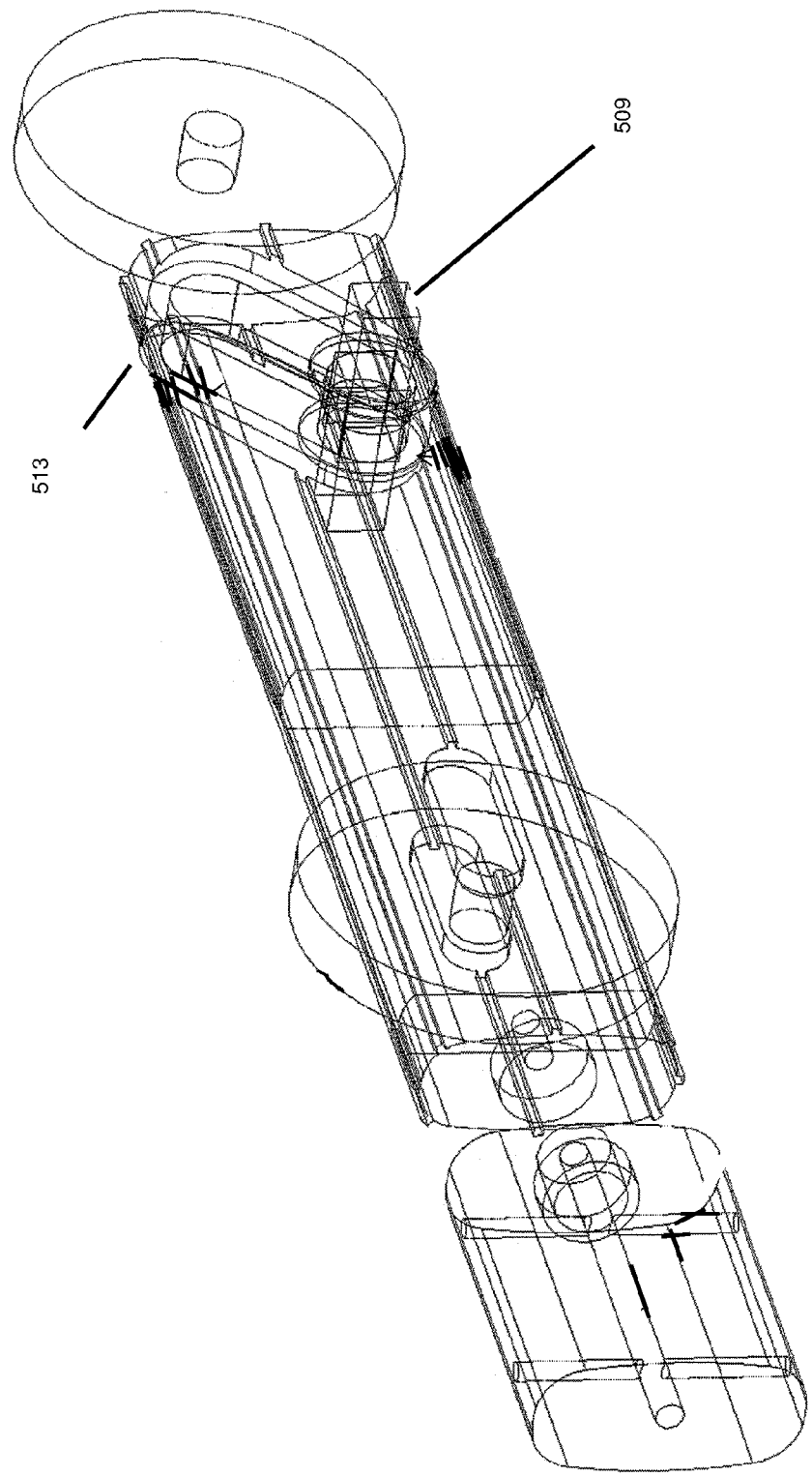
FIG. 25 is a perspective view schematic illustration of telescopic member locking mechanism of the present disclosure.
Figure 26:
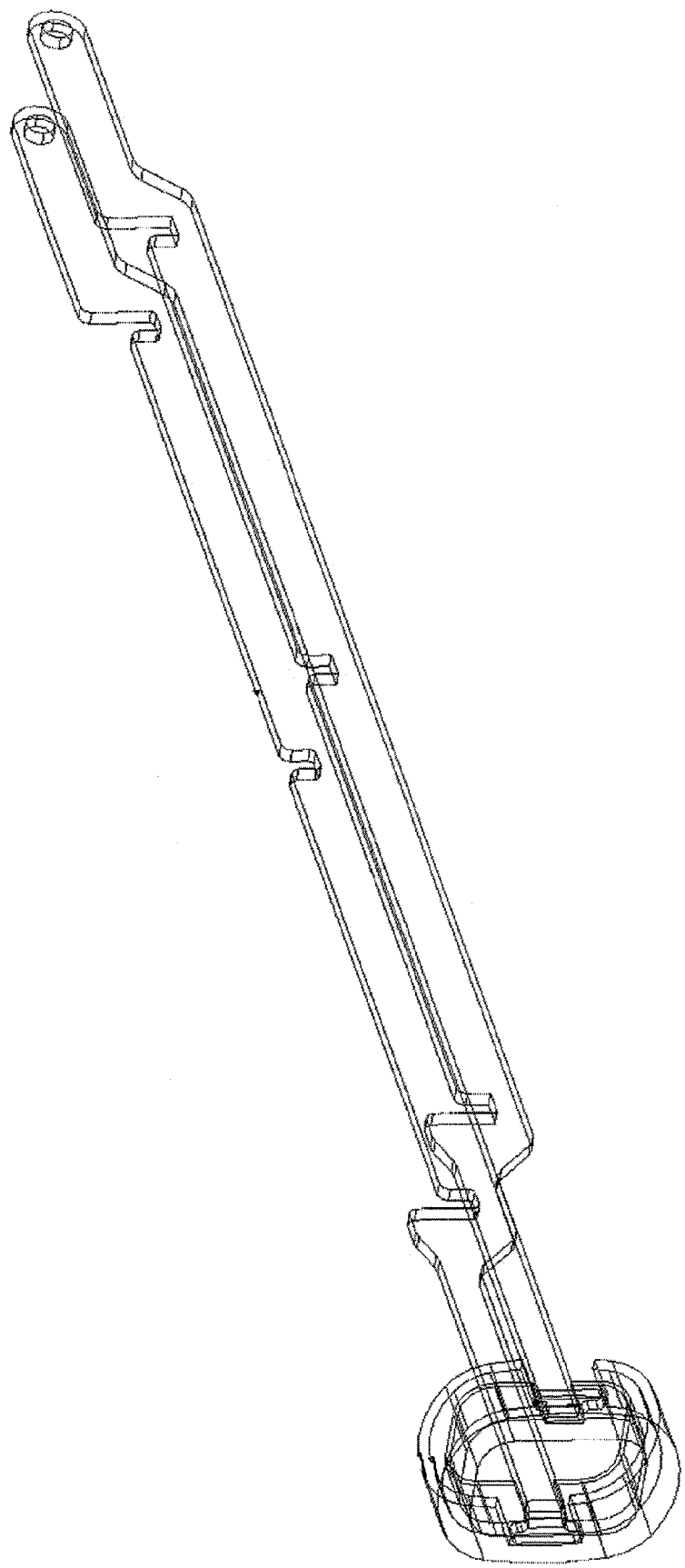
FIG. 26 is a perspective view schematic illustration of a female telescopic member for a locking mechanism of the present disclosure.
Figure 27:
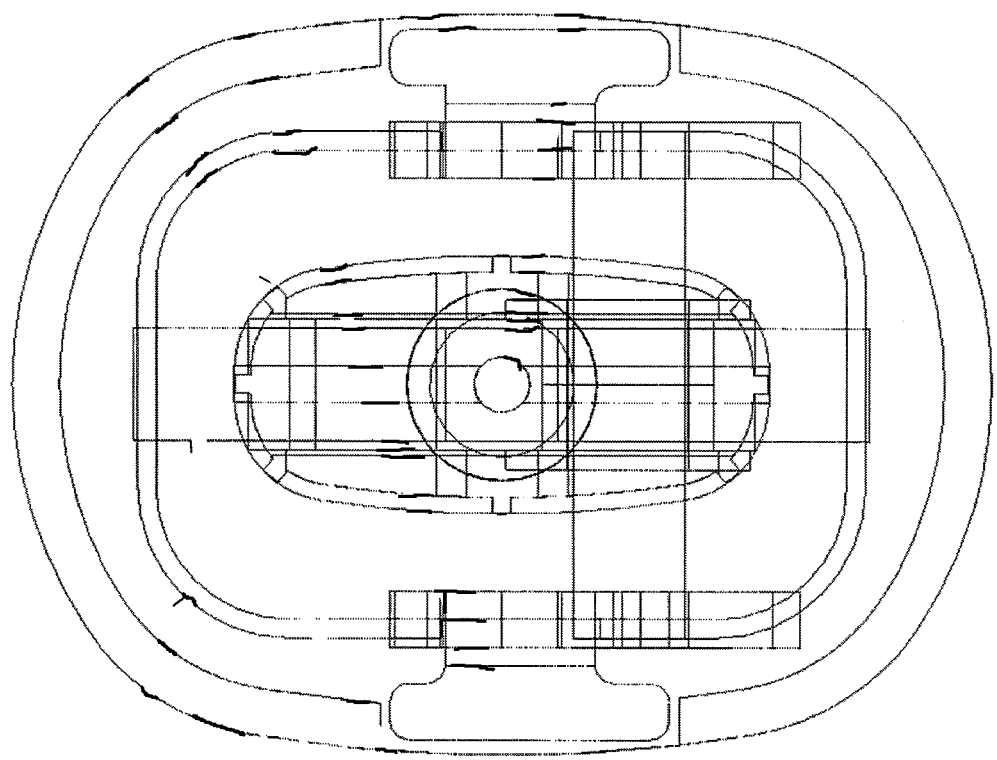
FIG. 27 is a front view schematic illustration of a male telescoping member for a locking mechanism of the present disclosure.
Figure 28:
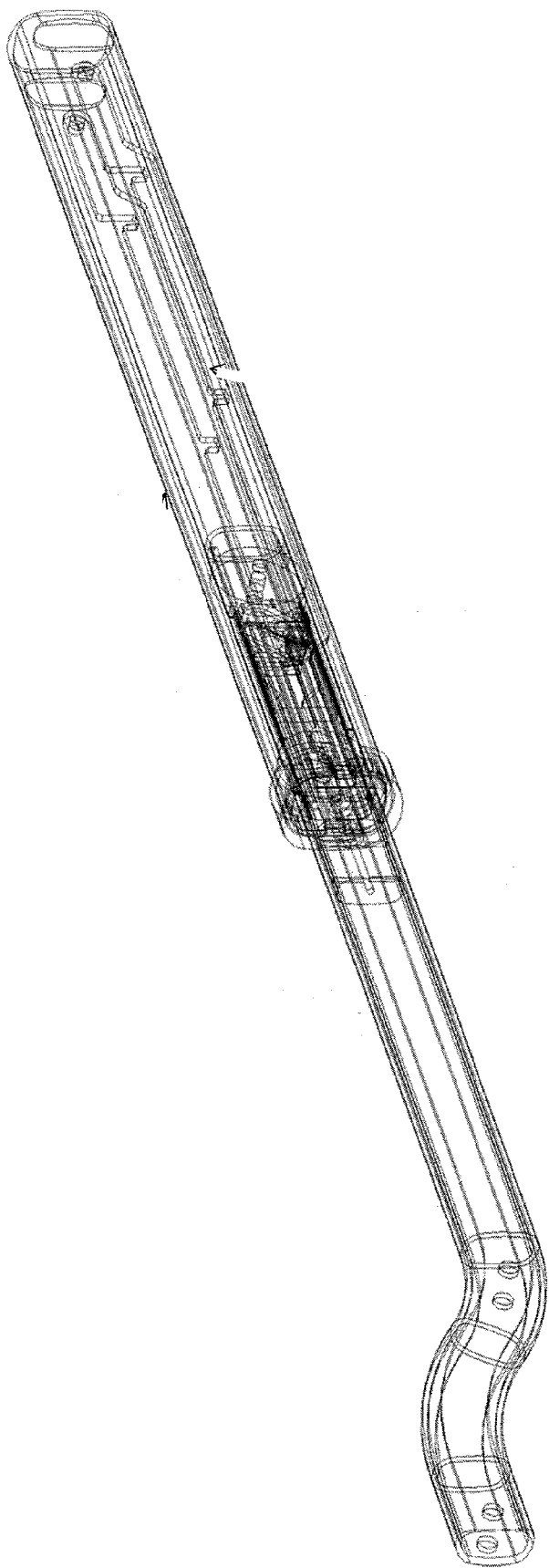
FIG. 28 is a perspective view schematic illustration of stroller frame portion with lockable telescoping members of the present disclosure.
Figure 29:
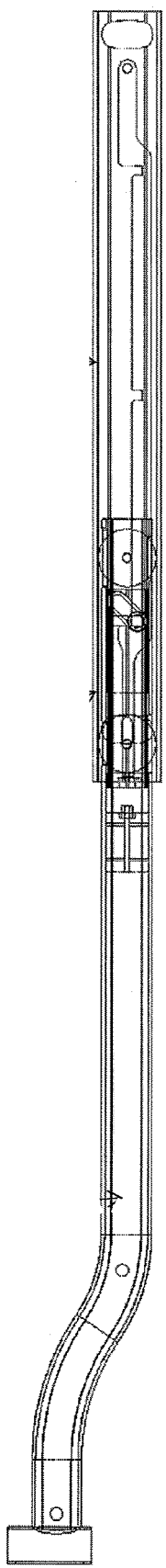
FIG. 29 is a side view schematic illustration of a telescopic tube assembly of the present disclosure.

The telescopic locking mechanism has three positions in which the pins/bars can lock into place. The initial position (FIG. 23, left), the intermediate expansion (FIG. 23, center), and the fully expanded position (FIG. 23, right). Although our system has three positions, the design itself allows for a multitude of locking positions.

The locking mechanism can also be used in the other embodiment in which the extendable base is extended by telescopic actuation of the handle (FIGS. 3A-3D from the converted utility app). In this case, the actuator for the lock may be forward of the telescopic handle (or not a part of it at all), but once the lock is released, telescoping the handle allows the tubes to slide relative to one another into their next locked position.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural, materials, and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the claims reflect, inventive subject matter lies in less than all features of a single disclosed embodiment. Thus the following claims are hereby incorporated into the Detailed Description, with each claim standing on its own as a separate embodiment.

The description has made reference to several exemplary embodiments. It is understood, however, that the words that have been used are words of description and illustration, rather than words of limitation. Changes may be made within the purview of the appended claims, as presently stated and as amended, without departing from the scope and spirit of the disclosure in all its aspects. Although description makes reference to particular means, materials and embodiments, the disclosure is not intended to be limited to the particulars disclosed; rather, the disclosure extends to all functionally equivalent technologies, structures, methods and uses such as are within the scope of the appended claims.

What is claimed is:

1. A stowable and deployable stroller for carrying one or more passengers and transporting items, the stroller comprising:
   a front frame member configured to support a seat;
   a rear frame member;
   a selectively extendable base member attached to the front frame member and the rear frame member, said selectively extendable base member further comprising:
       at least two pairs of tubes, wherein each pair of tubes comprises a first tube and a second tube, the first tube being smaller in circumference than the second tube, and the first tube further comprising at least one slot, said slot housing at least one wheel, said at least one wheel configured to make contact with the second tube, and said slot being located on a longitudinal exterior surface of the first tube;
   a locking mechanism, wherein the locking mechanism is configured to lock the first tube in a fixed position relative to the second tube when the locking mechanism is engaged, and the locking mechanism allows for movement of at least one of the first tube and the second tube with respect to the other of the first tube and the second tube when the locking mechanism is disengaged,
       wherein the locking mechanism further comprises at least one protruding element and at least one receiving element and is engaged when the at least one protruding element engages with the respective at least one receiving element,
wherein the at least one receiving element is housed against at least one inner wall of the second tube.

2. A stroller of claim 1, wherein the at least one receiving element is housed on opposite sides of the at least one inner wall of the second tube.

3. A stroller of claim 1, wherein the at least one receiving element is defined by plates or inserts connected to the second tube.

4. A stroller of claim 3 wherein the at least one protruding element does not protrude through the entire wall of the second tube.

5. A stroller of claim 1 wherein the first and second tubes are configured to be assembled such that the penetration of dirt and debris is at least one of obstructed and reduced.

6. A stroller of claim 5, wherein the an interface between the first tube and the second tube is sealed by means of plastic or rubber.

7. A stroller of claim 5, wherein the second tube is designed to be a continuous tube with a first end which connects to the first tube and a second end which connects to one of the first frame member and the second frame member, the an interface between the first tube and the second tube being enclosed in a way to substantially obstruct or reduce the penetration of dirt and debris.

* * * * *